US008743423B2

(12) United States Patent
Doi

(10) Patent No.: US 8,743,423 B2
(45) Date of Patent: Jun. 3, 2014

(54) IMAGE FORMING APPARATUS AND METHOD OF PRODUCING THRESHOLD VALUE MATRIX

(71) Applicant: Oki Data Corporation, Tokyo (JP)

(72) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 43 days.

(21) Appl. No.: 13/666,137

(22) Filed: Nov. 1, 2012

(65) Prior Publication Data

US 2013/0114110 A1 May 9, 2013

(30) Foreign Application Priority Data

Nov. 4, 2011 (JP) ................................ 2011-241881

(51) Int. Cl.
*H04N 1/405* (2006.01)

(52) U.S. Cl.
USPC ........................................................ 358/3.06

(58) Field of Classification Search
CPC ....... H04N 1/4051; H04N 1/405; H04N 1/52; B41J 11/002; B41J 2/2128
USPC ........... 358/3.06, 1.9, 3.09, 3.1, 3.3, 534, 3.2, 358/533, 536, 3.26
See application file for complete search history.

(56) References Cited

U.S. PATENT DOCUMENTS 5,202,772 A * 4/1993 Muir .............................. 358/1.9
8,169,666 B2 * 5/2012 Asai ............................ 358/3.06

FOREIGN PATENT DOCUMENTS

JP 2002-044445 A 2/2002

* cited by examiner

*Primary Examiner* — Charlotte M Baker
(74) *Attorney, Agent, or Firm* — Kubotera & Associates, LLC

(57) ABSTRACT

An image forming apparatus for depicting a gradation image through halftones includes a threshold value generating unit for generating a threshold value matrix, and a comparison unit for converting the gradation image. The threshold value generating unit determines an order of gradations of pixels in halftones. The threshold value generating unit determines an order of standard dots. Further, the threshold value generating unit is configured to determine a priority order of gradations between the halftones. The threshold value generating unit further determines an order of the threshold values of the gradations of all of the pixels according to the order of the gradations of the pixels contained in the halftones and the priority order of the gradations between the halftones, so that the threshold value generating unit generates the threshold value matrix.

9 Claims, 19 Drawing Sheets

Threshold value matrix generating unit 31
Standard dot arrangement determining unit 32
Halftone dividing unit 33
Pixel order determining unit 34
Priority order between halftones determining unit 35
Standard dot initializing unit 35a
Variable initializing unit 35b
Standard dot arbitrary selection unit 35c
Selected standard dot number assigning unit 35d
Potential addition unit 35e
Total standard dots number determining unit 35f
All pixels order determining unit 36
Pixel value standardizing unit 37
Threshold value matrix recording unit 38

| 0 | 3 | 14 | 17 | 15 | 2 | 0 | 3 | 14 |
|---|---|---|---|---|---|---|---|---|
| 4 | 8 | 11 | 16 | 12 | 7 | 4 | 8 | 11 |
| 13 | 10 | 5 | 1 | 6 | 9 | 13 | 10 | 5 |
| 17 | 15 | 2 | 0 | 3 | 14 | 17 | 15 | 2 |
| 16 | 12 | 7 | 4 | 8 | 11 | 16 | 12 | 7 |
| 1 | 6 | 9 | 13 | 10 | 5 | 1 | 6 | 9 |
| 0 | 3 | 14 | 17 | 15 | 2 | 0 | 3 | 14 |
| 4 | 8 | 11 | 16 | 12 | 7 | 4 | 8 | 11 |
| 13 | 10 | 5 | 1 | 6 | 9 | 13 | 10 | 5 |

FIG. 4

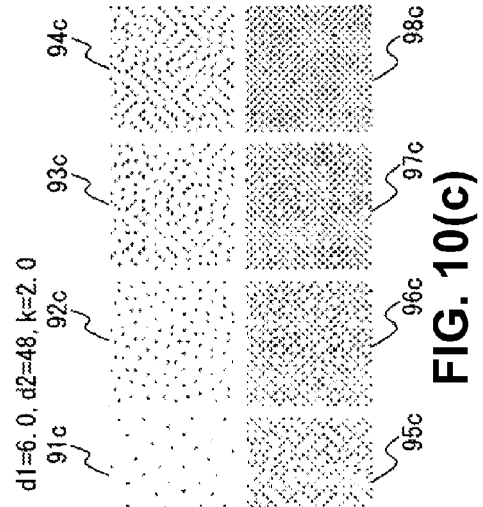
FIG. 10(c)
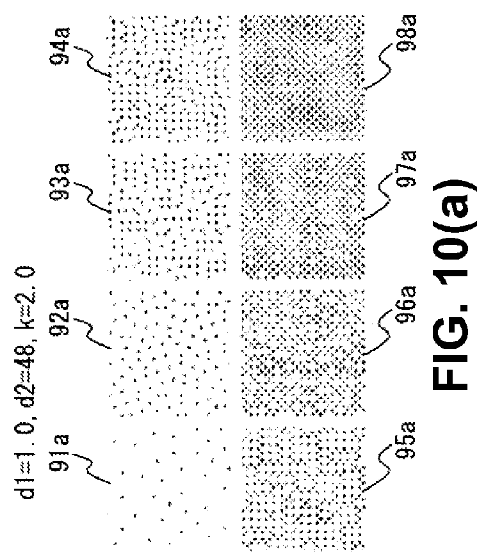
FIG. 10(a)
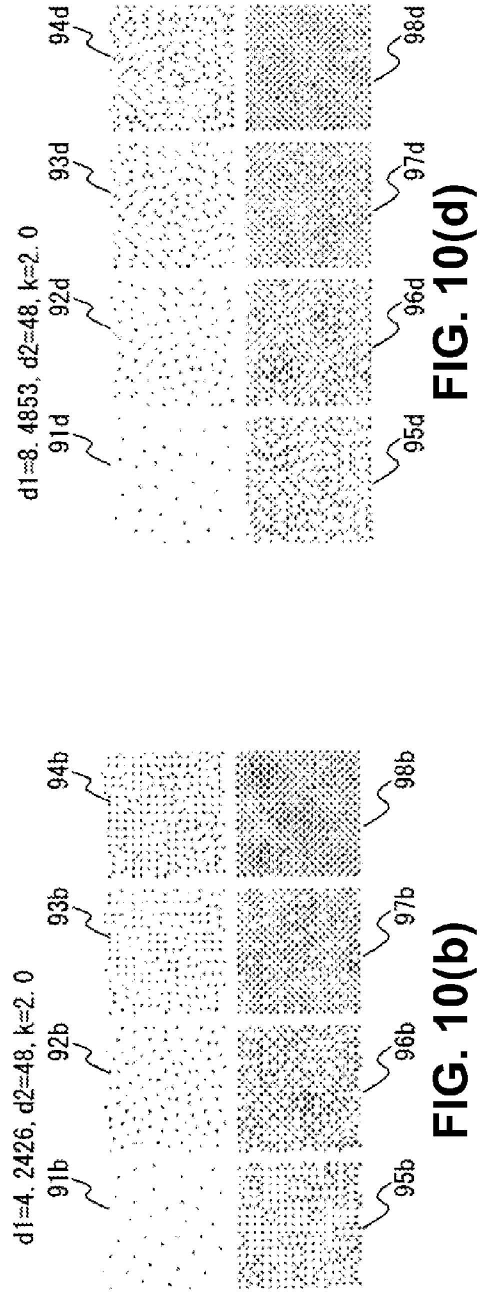
FIG. 10(d)
FIG. 10(b)

| 0 | 8 | 3 | 11 |
|---|---|---|---|
| 12 | 4 | 15 | 7 |
| 2 | 10 | 1 | 9 |
| 14 | 6 | 13 | 5 |

FIG. 11

IMAGE FORMING APPARATUS AND METHOD OF PRODUCING THRESHOLD VALUE MATRIX

BACKGROUND OF THE INVENTION AND RELATED ART STATEMENT

The present invention relates to an image forming apparatus and a method of producing a threshold value matrix. More specifically, the present invention relates to an image forming apparatus for converting an image received as an original image to a halftone image to form an image (referred to as halftone conversion).

Conventionally, when a multi gradation image is converted to a halftone image, a one-on-one comparison method has been used. In the one-on-one comparison method, first, an original image is recorded, and the original image is covered with a threshold value matrix in a tile pattern. Then, a pixel number is compared. When a comparison value is greater than a threshold value, a dot is turned on (an on dot or a black dot). When the comparison value is smaller than the threshold value, the dot is turned off (an off dot or a white dot). Accordingly, in the one-on-one comparison method, it is possible to obtain a binary image.

In the threshold value matrix, in general, a threshold value is arranged such that a dot pattern having a circle shape or a line shape is repeatedly formed with a specific periodic cycle and a specific angle. When a printing apparatus as an image forming apparatus possesses a high resolution, it is possible to sufficiently realize the gradations of the original image with an area ratio of one halftone.

However, when the printing apparatus is limited to possess a low resolution, it is possible to realize only limited gradations with one halftone. For example, when the printing apparatus having the output resolution of 600 DPI (600 dots per one inch) is used to form the halftones of 141 lines (141 periodic cycles per on inch), it is possible to realize 19 gradations with one halftone.

In this case, a production order is provided between a plurality of halftones, so that it is attempted to realize the gradations of the original image with a density represented as an average of the area ratios of the halftones. For example, when the halftones of 141 lines are produced, the production order of 4×4 is provided. As a result, it is possible to realize 304 gradations (4×4×19=304). When the original image has the gradations in a range of 0 to 255, 304 gradations described above are standardized to the output patterns having 256 gradations, so that it is possible to sufficiently realize the gradations of the original image.

In general, the production order between the halftones of the original is systematically determined with an order according to the Bayer arrangement. In the order according to the Bayer arrangement, the halftones are arranged regularly such that the halftones are distributed uniformly in a space. Further, the halftones are arranged so that the arrangement order becomes the highest frequency.

When a pattern has a line number smaller than the line number of the halftones of the original image, the pattern may be looked rough due to the regular production order between the halftones described above. Patent Reference has disclosed a method of reducing the roughness of such a pattern. According to Patent Reference, the production order between the halftones is determined from the standard dot arrangement point according to a blue noise property. It has been mentioned that although the blue noise is a random noise, the blue noise tends to be dispersed in the space uniformly to some extent when a low frequency component of the random noise is eliminated as much as possible. Accordingly, the blue noise tends to be comfortable to human eyes.

As described above, according to Patent Reference, the production order is determined according to the blue noise. Through the process, the regular production order between the halftones is dispersed, so that the resultant pattern becomes uniform in the space to some extent, and has a high frequency component with the low frequency component thus eliminated as much as possible. Accordingly, it is possible to make the pattern with the line number smaller than the line number of the halftones of the original image less outstanding.

Patent Reference: Japanese Patent Publication No. 2002-44445

With the conventional image forming apparatus disclosed in Patent Reference, however, it is difficult to obtain an image with high quality.

In view of the problems described above, an object of the present invention is to provide an image forming apparatus capable of forming an image with high quality.

Further objects and advantages of the invention will be apparent from the following description of the invention.

SUMMARY OF THE INVENTION

In order to attain the objects described above, according to a first aspect of the present invention, an image forming apparatus is configured to depict an M-level gradation image formed of a plurality of pixels having pixel numbers of M gradations (M is a natural number equal to or greater than three) through a plurality of halftones.

According to the first aspect of the present invention, the image forming apparatus includes a threshold value generating unit for generating a threshold value matrix of N gradations (N is a natural number equal to or greater than two), and a comparison unit for comparing each of the pixels numbers of the pixels of the M-level gradation image with each of corresponding threshold values of the threshold value matrix, so that the comparison unit converts the M-level gradation image to an N-level gradation image formed of a plurality of pixels having pixel numbers of the N gradations.

According to the first aspect of the present invention, the threshold value generating unit is configured to determine an arrangement of standard dots. Further, the threshold value generating unit is configured to divide all of the pixels to the halftones with an arrangement point of each of the standard dots as a center. Further, the threshold value generating unit is configured to determine an order of the gradations of the pixels contained in each of the halftones thus divided.

According to the first aspect of the present invention, the threshold value generating unit is configured to determine an order of the standard dots so that the arrangement of the standard dots determined upon completing ordering of a half of a total number of the standard dots is concentrated in a specific cycle determined by the arrangement of the standard dots from the arrangement points of the standard dots as the center of the halftones. Further, the threshold value generating unit is configured to determine a priority order of the gradations between the halftones.

According to the first aspect of the present invention, the threshold value generating unit is configured to determine an order of the threshold values of the gradations of all of the pixels from "1" to "N−1" according to the order of the gradations of the pixels contained in each of the halftones and the priority order of the gradations between the halftones, so that the threshold value generating unit generates the threshold value matrix having the threshold values from "1" to "N−1".

According to a second aspect of the present invention, an image forming apparatus is configured to convert an M-level gradation image formed of a plurality of pixels having pixel numbers of M gradations (M is a natural number equal to or greater than three) to a dot pattern of N gradations (N is a natural number equal to or greater than two) using an FM screen of a cluster type, so that the image forming apparatus forms an image.

According to the second aspect of the present invention, the image forming apparatus includes a threshold value generating unit for generating a threshold value matrix of the N gradations, and a comparison unit for comparing each of the pixels numbers of the pixels of the M-level gradation image with each of corresponding threshold values of the threshold value matrix, so that the comparison unit converts the M-level gradation image to the N-level gradation image formed of a plurality of pixels having pixel numbers of the N gradations.

According to the second aspect of the present invention, the threshold value generating unit is configured to coexist a pixel cluster of L dots (L is a natural number equal to or greater than two) and a pixel cluster of K dots (L is a natural number less than L) at a highlight portion of the FM screen of the cluster type.

According to a third aspect of the present invention, a method of producing a threshold value matrix used when an N-level gradation image (N is a natural number equal to or greater than two) is obtained from an M-level gradation image (M is a natural number equal to or greater than three) includes a standard dot arrangement determining process of determining an arrangement of standard dots; a halftones division process of dividing pixels into a plurality of halftones with an arrangement point of each of the standard dots as a center; a pixel order within halftone determining process of determining an order of the pixels contained in each of the halftones; a priority order determining process of determining a priority order between the halftones from the arrangement of the standard dots; an all pixels order determining process of determining a pixel order of all of the pixels; and a pixel number standardization process of standardizing the pixel order to threshold values from "1" to "N−1" according to input gradations N.

According to a fourth aspect of the present invention, a method of producing a threshold value matrix used when an N-level gradation image (N is a natural number equal to or greater than two) is obtained from an M-level gradation image (M is a natural number equal to or greater than three) includes a step of coexisting a pixel cluster of L dots (L is a natural number equal to or greater than two) and a pixel cluster of K dots (L is a natural number less than L) at a highlight portion of an FM screen of a cluster type.

In the image forming apparatus of the present invention, it is possible to form an image with high quality.

BRIEF DESCRIPTION OF THE DRAWINGS

FIG. 4 is a schematic view showing an example of an order of gradations of the pixels in the halftones shown in FIG. 3 according to the first embodiment of the present invention;

FIGS. 10(*a*) to 10(*d*) are schematic views showing examples of halftone images according to the first embodiment of the present invention;

FIG. 11 is a schematic side view showing an example of the Bayer arrangement according to a comparative example;

DETAILED DESCRIPTION OF PREFERRED EMBODIMENTS

Hereunder, embodiments of the present invention will be explained with reference to the accompanying drawings. It should be noted that the accompanying drawings are presented just for the explanation purpose, and the present invention is not limited to the accompanying drawings.

First Embodiment

Figure 1:
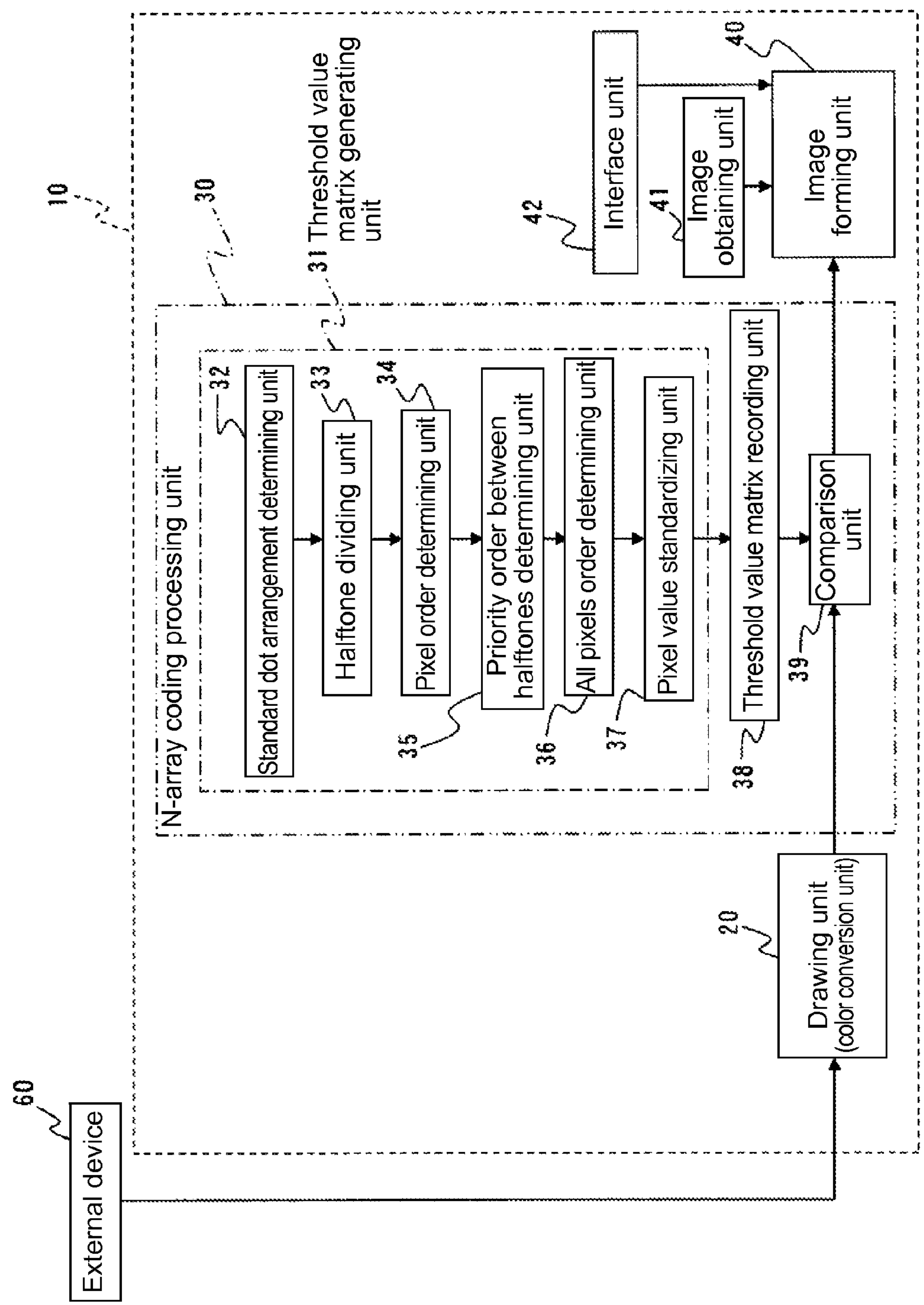
FIG. 1 is a block diagram showing a functional configuration of an image forming apparatus according to a first embodiment of the present invention.
Figure 2:
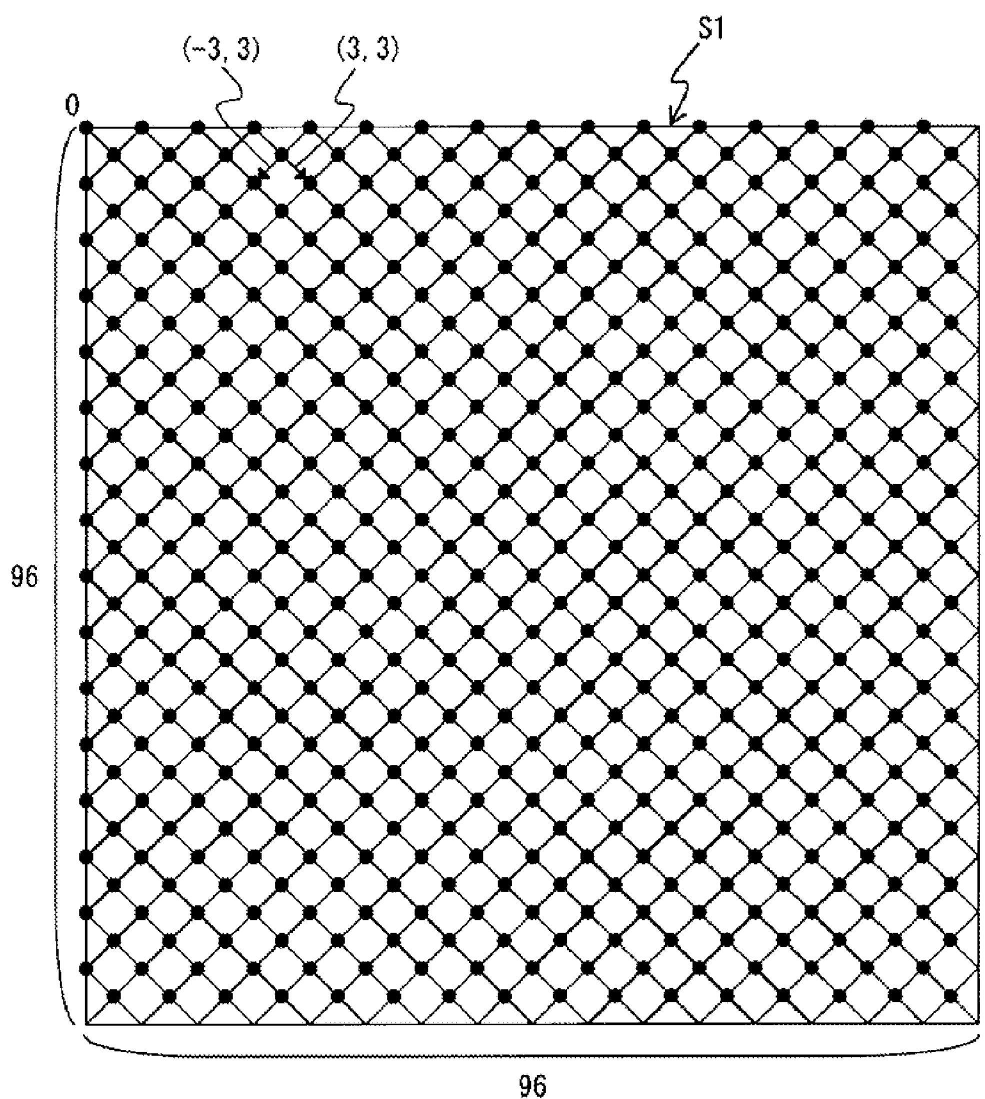
FIG. 2 is a schematic view showing an example of an arrangement of standard dots according to the first embodiment of the present invention.
Figure 3:
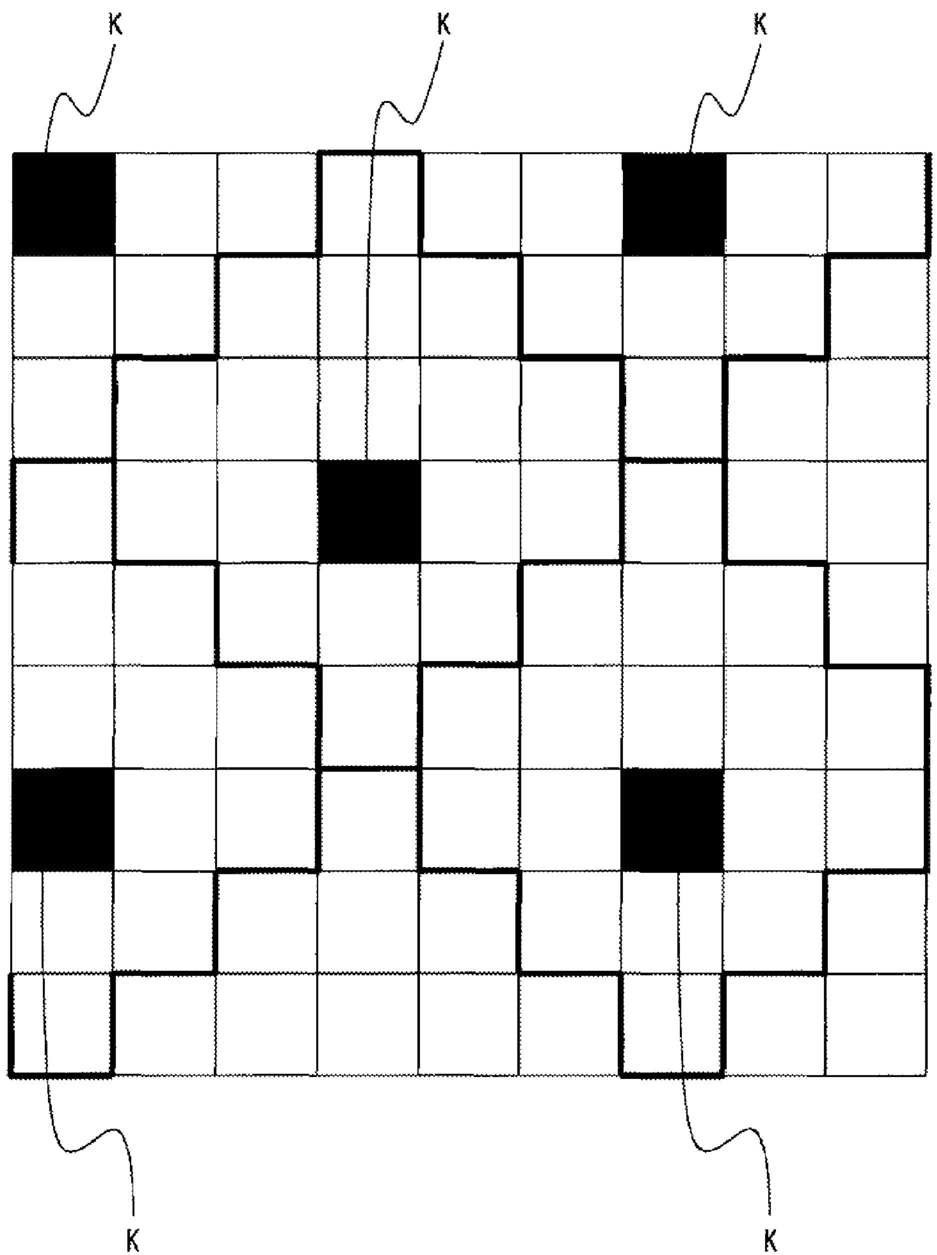
FIG. 3 is a schematic view showing an example of dividing a pixel to halftones with the standard dot shown in FIG. 2 as a center according to the first embodiment of the present invention.

A first embodiment of the present invention will be explained. FIG. 1 is a block diagram showing a functional configuration of an image forming apparatus 10 according to the first embodiment of the present invention. FIG. 2 is a schematic view showing an example of an arrangement S1 of standard dots according to the first embodiment of the present invention. FIG. 3 is a schematic view showing an example of dividing a pixel to halftones with the standard dot shown in FIG. 2 as a center according to the first embodiment of the present invention. FIG. 4 is a schematic view showing an example of an order of gradations of the pixels in the halftones shown in FIG. 3 according to the first embodiment of the present invention.

As shown in FIG. 1, the image forming apparatus 10 includes an N-array coding processing unit 30. The N-array coding processing unit 30 is formed of, for example, a processor for performing a program processing.

Further, the image forming apparatus 10 includes a drawing unit (a color conversion unit) 20 and an image forming unit 40, in addition to the N-array coding processing unit 30. In the embodiment, the drawing unit 20 and the N-array coding processing unit 30 are configured to perform a specific process on a multi-level image input from an external device 60 such as a host computer. Then, the image forming unit 40 is configured to output an image according to image data thus processed.

More specifically, in the embodiment, the external device 60 inputs the image data with 8 bit of, for example, red (R), green (G) and blue (B). In the next step, the drawing unit 20 is configured to perform a color conversion process on the image data with 8 bit of red (R), green (G) and blue (B), and outputs the image data to the N-array coding processing unit 30. Then, the N-array coding processing unit 30 is configured to convert the image data received the color conversion to N-array image data having a gradation number of N (N is a natural number), so that the N-array coding processing unit 30 outputs the N-array image data to the image forming unit 40.

In the embodiment, the N-array coding processing unit 30 may be formed of a processing unit for converting the image data received the color conversion to a halftone image. For example, when the image forming unit 40 is capable of forming a dot with a level of two, the N-array coding processing unit 30 is configured to convert the multi-level image data to the halftone image with the level of two.

In the embodiment, the image forming unit 40 may be formed of a printing apparatus of an electric-photography method such as an LED (Light Emitting Diode) printer and the like. Further, the image forming unit 40 has a function of forming an image on a recording sheet according to the image data obtained through an image obtaining unit 41 or the image data obtained through an interface unit 42.

In the embodiment, the N-array coding processing unit 30 has a function of converting the image data thus input and received the color conversion to the halftone image, so that the N-array coding processing unit 30 outputs the halftone image. The N-array coding processing unit 30 includes a threshold value matrix generating unit 31; a threshold value matrix recording unit 38; and a comparison unit 39. The threshold value matrix generating unit 31 is configured to record a threshold value matrix generated with the threshold value matrix generating unit 31 in advance.

In the embodiment, the threshold value matrix generating unit 31 is configured to generate the threshold value matrix to be recorded in the threshold value matrix recording unit 38 in advance. The threshold value matrix generating unit 31 includes a standard dot arrangement determining unit 32; a halftone dividing unit 33; a pixel order determining unit 34; a priority order between halftones determining unit 35; an all pixels order determining unit 36; and a pixel value standardizing unit 37.

In the embodiment, the standard dot arrangement determining unit 32 is configured to determine an arrangement of the standard dots. FIG. 2 shows the example of the arrangement S1 of the standard dots. As shown in FIG. 2, the arrangement S1 of the standard dots has a specific angle and a specific cycle. In general, a screen of the arrangement of the standard dots having a specific angle and a specific cycle is called an AM screen.

In the embodiment, the halftone dividing unit 33 is configured to divide the AM screen with the standard dot determined with the standard dot arrangement determining unit 32 as a center. FIG. 3 shows the example of dividing the pixel to the halftones with the standard dot K shown in FIG. 2 as the center. As shown in the example in FIG. 3, 18 pixels are included in the halftones represented by an area surrounded by a bold line.

In the embodiment, the pixel order determining unit 34 is configured to determine an order of gradations with respect to the pixels in the halftones divided with the halftone dividing unit 33. FIG. 4 shows the example of the order of the gradations of the pixels in the halftones shown in FIG. 3. As shown in the example in FIG. 4, the standard dot assigned with “0” becomes the center, and each of the pixels is assigned with a number from “1” to “17” such that the number becomes larger toward outside. The number assigned to the pixel represents a level determining the gradation of the pixel, and a smaller number represents a lower threshold value.

In the embodiment, the priority order between halftones determining unit 35 is configured to determine a priority order of each of the halftones divided with the halftone dividing unit 33. When the arrangement of the standard dots is the AM screen shown in FIG. 2, there are 9,216 pixels (96×96=9,216). Accordingly, 512 halftones are generated around 512 standard dots as the center. As a result, the priority order between halftones determining unit 35 determines the priority order from 0 to 511.

In the embodiment, the all pixels order determining unit 36 is configured to determine an order of the gradations with respect to all of 9,216 pixels on the AM screen according to the order of the pixels in the halftones determined with the pixel order determining unit 34 and the priority order between the pixels determined with the priority order between halftones determining unit 35.

In the embodiment, the pixel value standardizing unit 37 is configured to standardize the order of the pixels determined with the all pixels order determining unit 36 according to an input gradation, so that the pixel value standardizing unit 37 determines all of the threshold values of the threshold value matrix. For example, when there are 256 input gradations, the pixel value standardizing unit 37 standardizes the order of the pixels with respect to 9,216 pixels such that the order of the pixels becomes the threshold values between 0 and 255.

In the embodiment, the threshold value matrix recording unit 38 is configured to record the threshold value matrix generated with the threshold value matrix generating unit 31 in advance. Further, the comparison unit 39 is configured to compare the image data having M levels (M is a natural number greater than 3) to the threshold values from “1” to “N−1” recorded in the threshold value matrix recording unit 38 in advance. Accordingly, the comparison unit 39 is configured to output the halftone image having N gradations (N is a natural number greater than 2).

Figure 5:
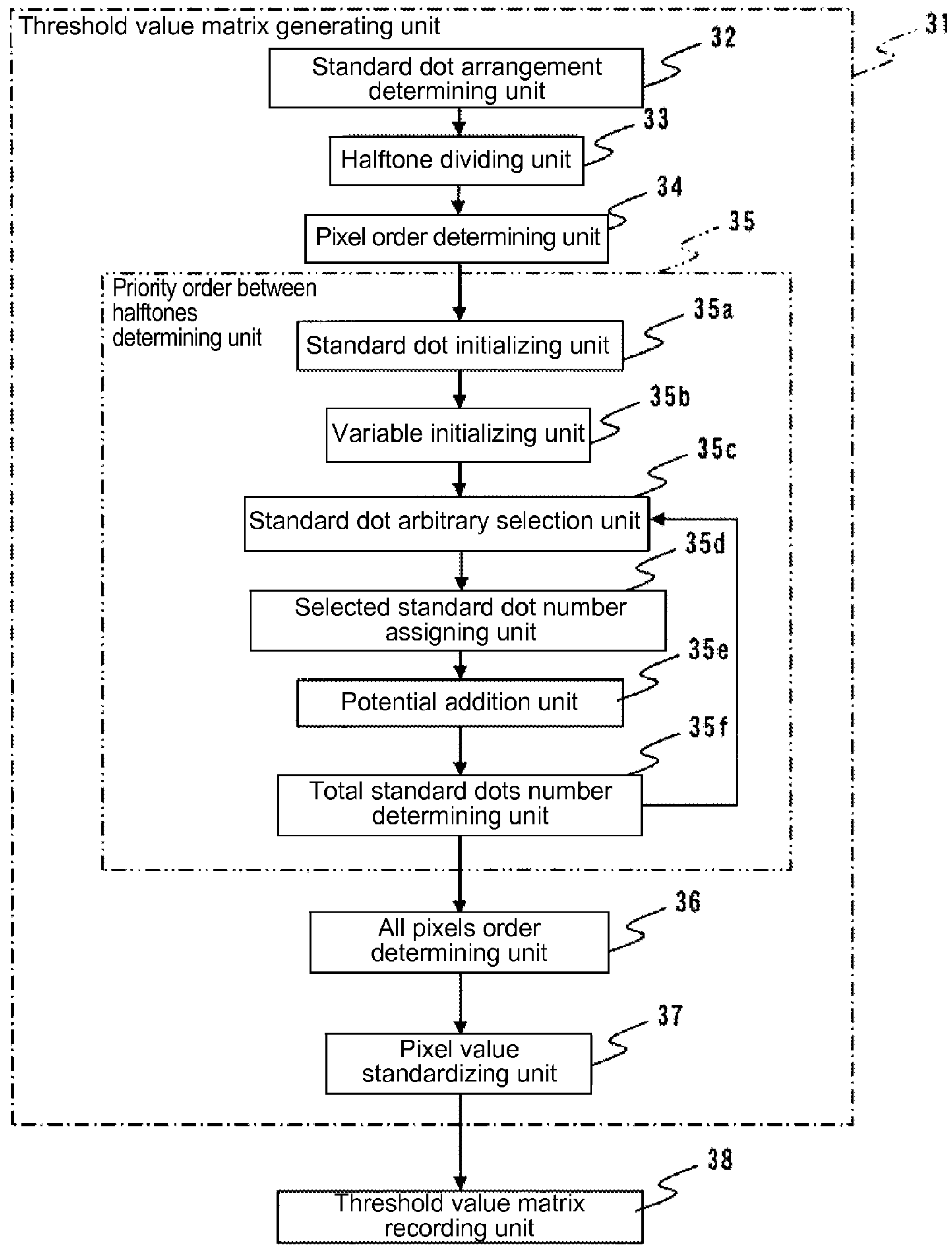
FIG. 5 is a block diagram showing a functional configuration of a threshold value matrix generating unit of the image forming apparatus according to the first embodiment of the present invention.

FIG. 5 is a block diagram showing a functional configuration of the threshold value matrix generating unit 31 of the image forming apparatus 10 according to the first embodiment of the present invention. The functional configuration of the priority order between halftones determining unit 35 will be explained in detail with reference to FIG. 5.

In the embodiment, the priority order between halftones determining unit 35 is configured to determine the priority of each of the halftones divided with the halftone dividing unit 33. As shown in FIG. 5, the priority order between halftones determining unit 35 includes a standard dot initializing unit 35*a*; a variable initializing unit 35*b*; a standard dot arbitrary selection unit 35*c*; a selected standard dot number assigning unit 35*d*; a potential addition unit 35*e*; and a total standard dots number determining unit 35*f*.

In the embodiment, the standard dot initializing unit 35*a* is configured to set "0" to a potential of all of the standard dots. The variable initializing unit 35*b* is configured to set "0" to a variable n for initialization. The standard dot arbitrary selection unit 35*c* is configured to arbitrarily select one of the standard dots from a standard dot group having a lowest potential among the standard dots with no number assigned.

Further, the selected standard dot number assigning unit 35*d* is configured to assign the number n to the standard dot selected immediately before. The potential addition unit 35*e* is configured to calculate the potential to be received by each of the standard dots at a position of each of the standard dots with no number assigned when the potential is given to a position of the standard dot selected immediately before, so that the potential addition unit 35*e* adds the potential thus calculated to each of the potentials. The all standard dots number determining unit 35*f* has a function of determining whether the variable n matches the standard dot number.

Figure 6:
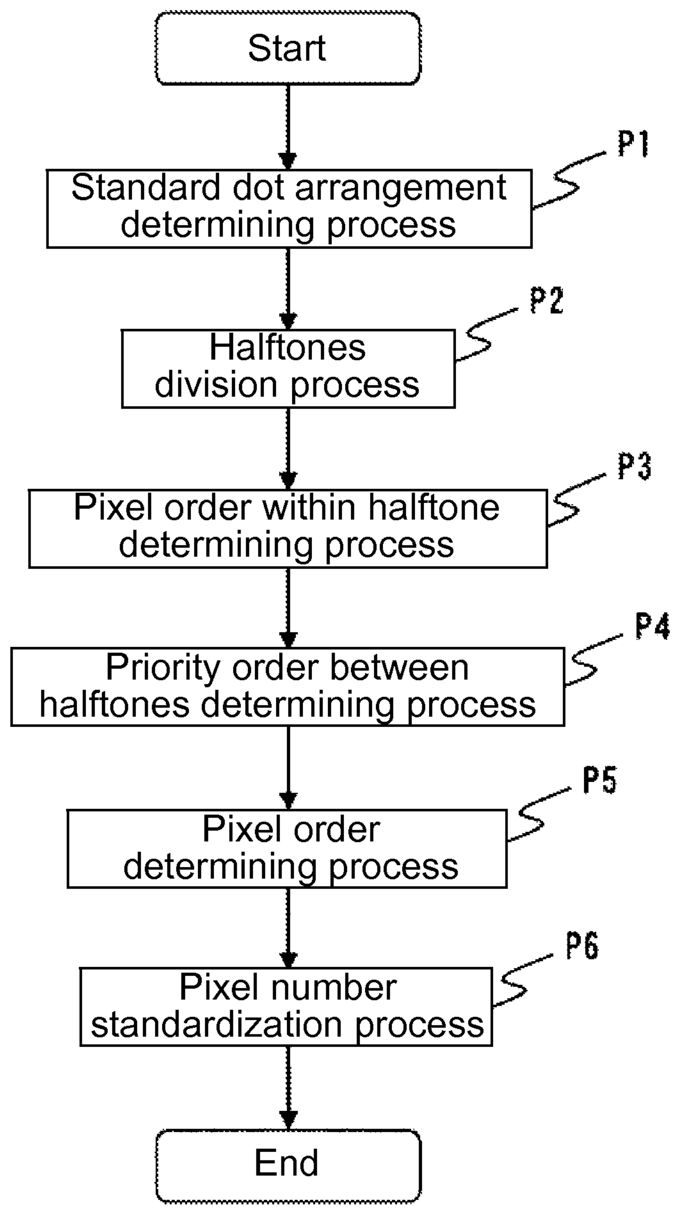
FIG. 6 is a flow chart view showing an operation flow of the threshold value matrix generating unit of the image forming apparatus according to the first embodiment of the present invention.

FIG. 6 is a flow chart view showing an operation flow of the threshold value matrix generating unit 31 of the image forming apparatus 10 according to the first embodiment of the present invention. Processes P1 to P6 for generating the threshold value matrix shown in FIG. 5 will be explained with reference to FIGS. 1 to 4.

In the standard dot arrangement determining process P1, first, the standard dot arrangement determining unit 32 shown in FIG. 1 determines the arrangement of the standard dots. It is noted that the standard dot is the dot to become a core of the halftones, and the standard dot arrangement determining unit 32 determines the positions of the standard dots such that the standard dots are repeatedly arranged on the two-dimensional plane with the specific angle and the specific cycle.

For example, when the standard dots with the cycle of 141 lines and the angles of 45 degrees and 135 degrees are arranged on the two-dimensional plane having the pixel pitch of 600 DPI, the standard dots are arranged such that two of the standard dots at positions closest adjacent to one standard dot have a positional relationship of (3, 3) and (−3, 3) as shown in FIG. 2. In the example shown in FIG. 2, 512 of the standard dots are arranged on the pixel plane of 96×96.

In the halftones division process P2, the halftone dividing unit 33 shown in FIG. 1 divides the pixels into the areas (the halftones) around each of the standard dots as the center. FIG. 3 shows the example, in which the pixels are divided to the areas around each of the standard dots as the center with respect to the standard dots arranged to have the cycle of 141 lines shown in FIG. 2. As shown in FIG. 3, the pixels filled with black represent the standard dots, and the areas surrounded with the bold line represent the areas (the halftones) around each of the standard dots as the center. In the example shown in FIG. 3, each of the halftones includes 18 of the pixels.

In the pixel order within halftone determining process P3, the pixel order determining unit 34 shown in FIG. 1 determines the order of the pixels included in each of the halftones. According to the order thus determined, a shape emerged upon the growth of the halftone is determined. FIG. 4 shows the example, in which the order of the pixels included in each of the halftones shown in FIG. 3. In the example shown in FIG. 4, the order of the pixels included in each of the halftones is intended to form a circular donut shape that is frequently used in a printing operation.

In general, when the dot pattern is used for off-set printing or the electric-photography printer, the dot pattern of the concentrated dot type is frequently used. In the dot pattern of the concentrated dot type, it is intended that an area of a black portion of the dot pattern is gradually increased as the output gradation becomes higher at the core (the standard dot) of each of the pixels as the center. In the pixel order within halftone determining process P3, the order of the pixels included in each of the halftones is determined with respect to one halftone, and the order determined with respect to one halftone is applied to all of the halftones.

In the priority order between halftones determining process P4, the priority order between halftones determining unit 35 shown in FIG. 1 determines the priority order between the halftones divided in the halftones division process P2.

In the all pixels order determining process P5, the all pixels order determining unit 36 shown in FIG. 1 determines the order of all of the pixels included in the threshold value matrix using the order of the pixels in the halftones determined the pixel order within halftone determining process P3 and the priority order (the number) between the pixels determined in the priority order between halftones determining process P4. For example, the all pixels order determining unit 36 determines the order through the following equation:

(The order of the pixels)=(the priority order of the halftone including the target pixel)+(the order of the target pixel in the halftone)×(the total number of the halftones)

For example, there are 9,216 of the pixels (96×96=9,216) included in the threshold value matrix generated according to the standard dot arrangement shown in FIG. 2. Accordingly, the orders from "0" to "9,215" are given to all of the pixels without overlapping.

In the pixel number standardization process P6, the pixel value standardizing unit 37 shown in FIG. 1 standardizes the order of the pixels determined in the all pixels order determining process P5 according to the input gradation, so that the pixel value standardizing unit 37 determines all of the threshold values of the threshold value matrix. For example, when there are 256 input gradations, the pixel value standardizing unit 37 standardizes the order of the pixels such that the threshold values become between 0 and 255. Through the processes P1 to P6 described above, the threshold value matrix is generated.

Next, the priority order between halftones determining process P4 performed by the priority order between halftones determining unit 35 shown in FIG. 1 will be explained in more detail.

In the embodiment, the priority order between the halftones is determined from the arrangement of the standard dots. More specifically, the priority order between the halftones is determined through assigning a specific number to all of the halftones (the standard dots) thus arranged. For example, in the arrangement of the standard dots shown in FIG. 2, there are 512 of the standard dots, and the specific numbers from 0 to 511 are assigned to all of the standard dots.

Figure 7:
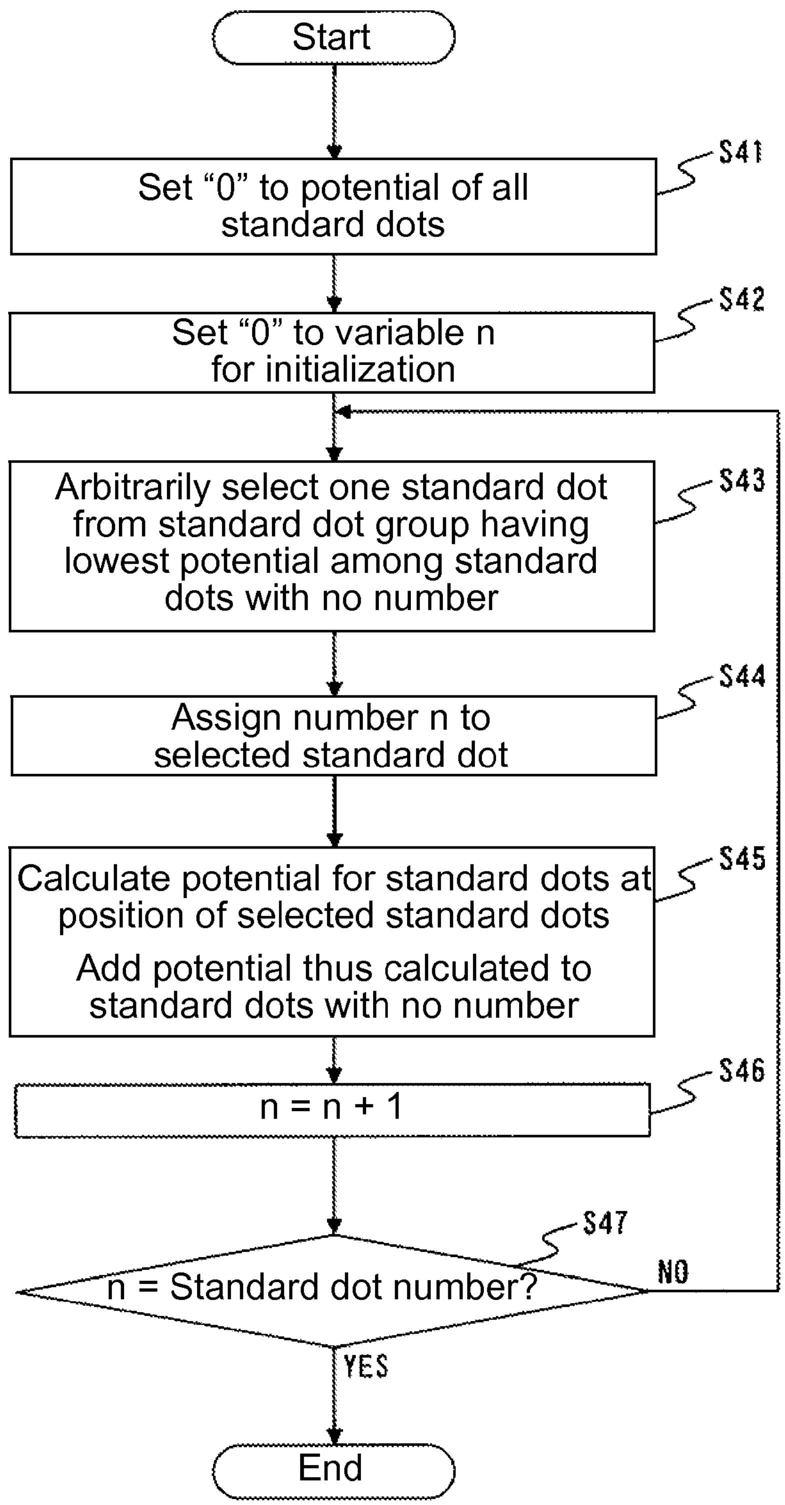
FIG. 7 is a flow chart showing an operation flow of the threshold value matrix generating unit of the image forming apparatus in a priority order between halftones determining process according to the first embodiment of the present invention.

FIG. 7 is a flow chart showing an operation flow of the threshold value matrix generating unit 31 of the image forming apparatus 10 in the priority order between halftones determining process P4 according to the first embodiment of the present invention. The operation flow of the priority order between halftones determining process P4 will be explained with reference to FIG. 7.

As shown in FIG. 7, when the priority order between halftones determining unit 35 starts the operation, the process proceeds to step S41. In step S41, the standard dot initializing unit 35*a* sets “0” to the potential of all of the standard dots, and the process proceeds to step S42. In step S42, the variable initializing unit 35*b* sets “0” to the variable n for initialization, and the process proceeds to step S43.

In step S43, the standard dot arbitrary selection unit 35*c* arbitrarily selects one of the standard dots from the standard dot group having a lowest potential among the standard dots with no number assigned. Then, the process proceeds to step S44. It is noted that immediately after the initialization, the potential of all of the standard dots is “0”, and no number is assigned to all of the standard dots. Accordingly, the standard dot arbitrary selection unit 35*c* randomly selects one standard dot from all of the standard dots. In step S44, the selected standard dot number assigning unit 35*d* assigns the number n to the standard dot selected immediately before, and the process proceeds to step S45.

In step S45, the potential addition unit 35*e* calculates the potential to be received by each of the standard dots at the position of each of the standard dots with no number assigned when the potential is given to a position of the standard dot selected immediately before, so that the potential addition unit 35*e* adds the potential thus calculated to each of the potentials. It is noted that each of the potentials is given by the following equation:

$$E=1.0-1/\{1-\exp(d-d1)\times k\} \quad (\because d<d2)$$

$$E=0.0 \quad (\because d\geq d2)$$

In the above equation, d represents a distance between the standard dot selected immediately before and each of the standard dots with no number assigned; k represents an arbitrary constant that provides a shape of an edge of the potential. Further, d1 represents an arbitrary constant that provides a distance where the potential becomes half; and d2 represents an arbitrary constant that provides a distance where the potential becomes zero.

Figure 8:
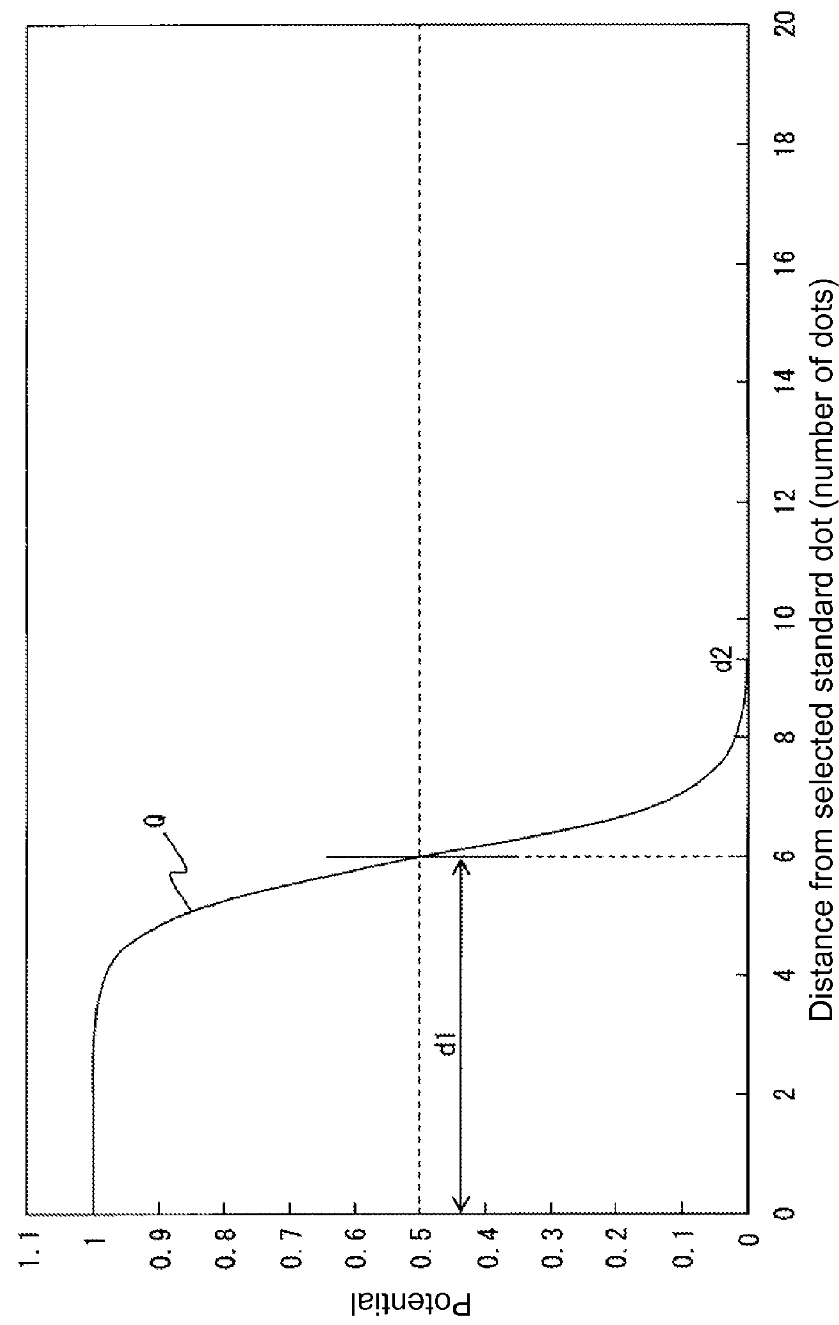
FIG. 8 is a graph showing an example of a potential curve according to the first embodiment of the present invention.

FIG. 8 is a graph showing an example of a potential curve Q according to the first embodiment of the present invention.

As shown in FIG. 8, the potential curve Q shows a relatively flat portion, where the potential value is “1”, in a region where the distance from the selected standard dot is small (near the center of the selected standard dot). The potential is designed to provide a restriction to the standard dot selected in step S43. More specifically, in FIG. 8, the potential is “0.5” at the distance d1 corresponding to 6 dots from the selected standard dot, and the potential is “0” at the distance d2 corresponding to 9 dots from the selected standard dot FIG. 9 is a schematic view showing a principle of the restriction defined with the distance d2 from the center of the standard dot according to the first embodiment of the present invention.

Figure 9:
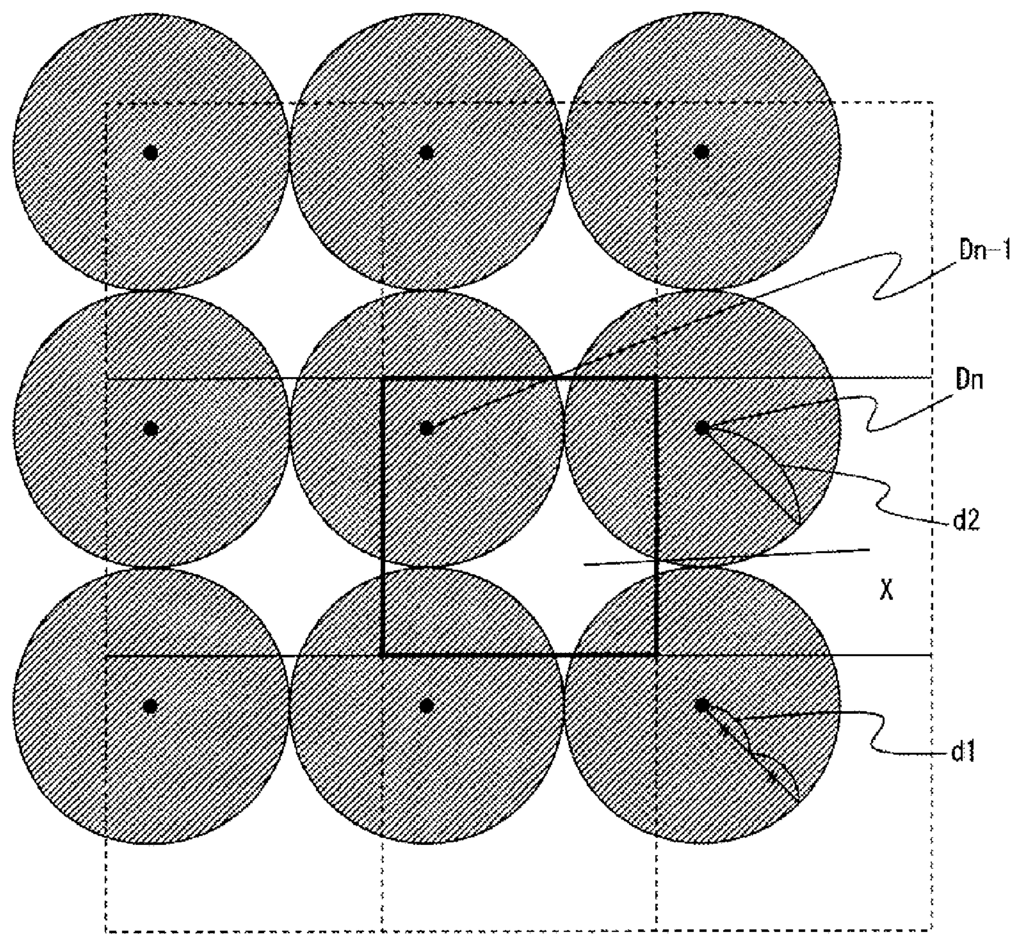
FIG. 9 is a schematic view showing a principle of a restriction defined with a distance d2 from a center of the standard dot according to the first embodiment of the present invention.

As shown in FIG. 9, when the standard dot is randomly selected from a plurality of the standard dots having the identical potential, the restriction is imposed such that the next standard dot Dn is selected from the position away from the standard dot Dn−1 selected immediately before by the distance d2 (a region X other than a hatched region). It is noted that the distance d1 from the center of the standard dot is set about a half of a length of one side of the halftone.

Further, with the distance d1, it is possible to impose the restriction such that the interval of the arrangement of the standard dots to be selected is concentrated to the distance d1. Further, at the flat portion of the potential curve Q near the center that can be adjusted by the constant k, with respect to the standard dot to be selected such that the standard dot is connected (clustered) to the standard dot selected in an early stage, the connectivity regarding the standard dot included in the flat portion of the potential becomes higher than the standard dots not included in the flat portion.

In step S46, the potential addition unit 35*e* adds “1” to the variable n, and the process proceeds to step S47. In step S47, the total standard dots number determining unit 35*f* determines whether the variable n matches the standard dot number (in the case of the arrangement of the standard dots shown in FIG. 2, the standard dot number is 512). When the total standard dots number determining unit 35*f* determines that the variable n does not match the standard dot number, the process returns to step S43. When the total standard dots number determining unit 35*f* determines that the variable n does match the standard dot number, the process is complete.

Through the process from step S41 to step S47, the priority order between halftones determining unit 35 determines the specific numbers (the priority order) to all of the standard dots. It is noted that although the priority order of the standard dots thus determined is randomly arranged, the priority order is uniform in the space to some extent. Further, the high frequency component is arranged along with the cycle of the distance dl set to the potential in step S45. When the priority order between halftones determining process P4 is complete, the process proceeds to the all pixels order determining process P5 shown in FIG. 6.

Figure 12:
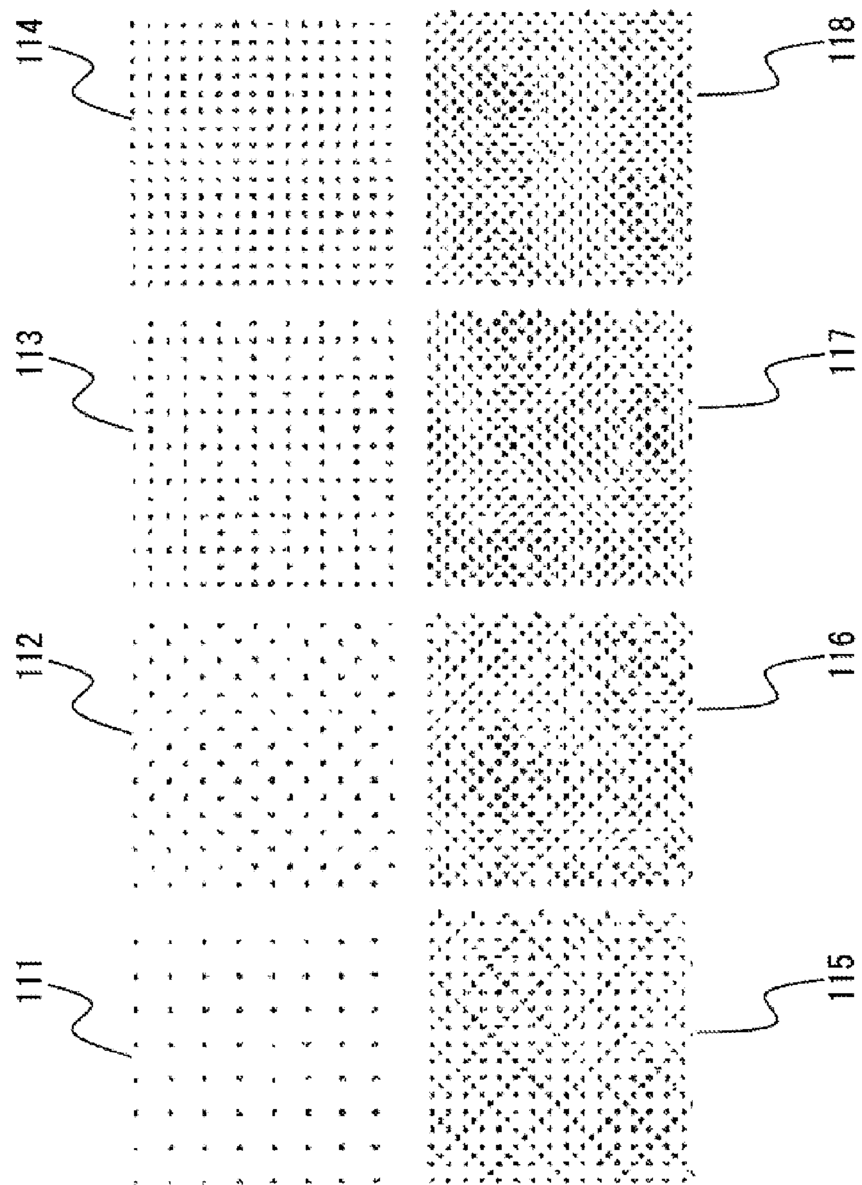
FIG. 12 is a schematic view showing examples of halftone images according to the comparative example.

A comparative example will be explained next. FIG. 11 is a schematic side view showing an example of the Bayer arrangement according to the comparative example. FIG. 12 is a schematic view showing examples of halftone images according to the comparative example.

In the comparative example, in order to determine the priority order between the halftones, for example, in order to determine the priority order between the halftones as the pixel order in the halftones as shown in FIG. 4, the Bayer arrangement shown in FIG. 11 is used. More specifically, the order of all of the pixels is determined based on the priority order between the halftones determined using the Bayer arrangement shown in FIG. 11. In this case, the priority order between the halftones of 4×4 is determined regularly according to the Bayer arrangement, so that the threshold value matrix is generated.

FIG. 12 shows the halftone images using the threshold value matrix, in which the priority order between the halftones is determined regularly according to the Bayer arrangement of the comparative example.

As shown in FIG. 12, eight halftone images 111 to 118 are presented. The halftone images 111, 112, 113, and 114 shown at an upper portion correspond to output gradations of 1, 3, 5, and 7, respectively. The halftone images 115, 116, 117, and 118 shown at a lower portion correspond to output gradations of 9, 11, 13, and 15, respectively. As evident from FIG. 12, the halftone images 113 and 115 exhibit rough patterns on a lattice.

Further, the halftone image 114 exhibits a pattern having angles (0 degree and 90 degrees) different from the angles (45 degrees and 135 degrees) of the ordinary halftones. Because of the pattern, when the original image having the gradation continuously changing is converted to the halftone image, the continuity of the pattern between the gradations is deteriorated, thereby causing poor appearance.

To this end, in the embodiment, the priority order between halftones determining unit 35 performs the priority order between halftones determining process P4 in the different way from the comparative example.

FIGS. 10(*a*) to 10(*d*) are schematic views showing examples of the halftone images according to the first embodiment of the present invention. As described above, the standard dots shown in FIGS. 2 and 4 have the cycle of 141 lines and the angles of 45 degrees and 135 degrees. Then, when the priority order between the halftones is determined, the specific parameters are provided to the potential, thereby generating the threshold value matrix. The halftone images shown in FIGS. 10(*a*) to 10(*d*) are obtained using the threshold value matrix.

FIG. 10(*a*) shows the halftone images 91*a* to 98*a* formed when the distance dl is equal to 1.0, the distance d2 is equal to 48, and the constant k is equal to 2.0 (d1=1.0, d2=48, k=2.0). The halftone images 91*a* to 98*a* correspond to the output gradations of 1, 3, 5, 7, 9, 11, 13, and 15, respectively.

FIG. 10(*b*) shows the halftone images 91*b* to 98*b* formed when the distance dl is equal to 4.2426, the distance d2 is equal to 48, and the constant k is equal to 2.0 (d1=4.2426, d2=48, k=2.0). The halftone images 91*b* to 98*b* correspond to the output gradations of 1, 3, 5, 7, 9, 11, 13, and 15, respectively.

FIG. 10(*c*) shows the halftone images 91*c* to 98*c* formed when the distance d1 is equal to 6.0, the distance d2 is equal to 48, and the constant k is equal to 2.0 (d1=6.0, d2=48, k=2.0). The halftone images 91*c* to 98*c* correspond to the output gradations of 1, 3, 5, 7, 9, 11, 13, and 15, respectively.

FIG. 10(*d*) shows the halftone images 91*d* to 98*d* formed when the distance d1 is equal to 8.4853, the distance d2 is equal to 48, and the constant k is equal to 2.0 (d1=8.4853, d2=48, k=2.0). The halftone images 91*d* to 98*d* correspond to the output gradations of 1, 3, 5, 7, 9, 11, 13, and 15, respectively.

As described above, the parameter given by the distance d1 provides the cycle of the high frequency component of the pattern thus generated. As shown in FIGS. 10(*a*) to 10(*d*), the distance d1 is given such that the frequency of the high frequency component is increased in the order from FIG. 10 (d) to FIG. 10(*c*), FIG. 10(*b*), to FIG. 10(*a*). In the patterns actually generated, it can be seen that the frequency of the high frequency component is increased in the order from FIG. 10(*d*) to FIG. 10(*c*), FIG. 10(*b*), to FIG. 10(*a*).

However, the dot patterns shown in FIGS. 10(*a*) and 10(*b*) do not exhibit significant visual differences. This is caused relating to the inter dot distance of the standard dots. The minimum value of the inter dot distance in the arrangement of the standard dots is about 4.2426 (in the case when the inter pixel pitch of 600 DPI is 1), and no inter dot distance smaller than the minimum value does not exist. In FIG. 10(*a*), the distance d1 is set to the value smaller than the minimum value of the inter dot distance. Accordingly, the dot patterns shown in FIG. 10(*a*) are similar to those shown in FIG. 10(*b*).

In FIG. 10(*c*), the distance d1 is set to the value (=6.0) corresponding to the second smallest value of the inter dot distance in the arrangement of the standard dots. In FIG. 10(*d*), the distance d1 is set to the value (=8.4853) corresponding to the third smallest value of the inter dot distance in the arrangement of the standard dots. Accordingly, the dot patterns shown in FIG. 10(*c*) are similar to those shown in FIG. 10(*d*).

As described above, when the bias of the cycle of the high frequency component with respect to the positions of the dots arranged periodically is changed, the selectable cycle tends to be widely dispersed. Further, the connectivity adjusted at the flat portion of the potential near the center receives the restriction described above. Accordingly, in order to secure the connectivity, it is necessary to set the width of the flat portion of the potential near the center to at least the width of the minimum value of the inter dot distance.

As shown in FIGS. 10(*a*) and 10(*b*), the dot patterns look biased toward 0 degree and 90 degrees neat the output gradations of 7 and 9. As shown in FIGS. 10(*c*) and 10(*d*), the dot patterns do not exhibit bias of 0 degree and 90 degrees.

Further, as shown in FIGS. 10(*a*) and 10(*b*), the bias of the dot patterns neat the output gradations of 7 and 9 exhibits poor uniformity in the wider space as compared with the dot patterns shown in FIGS. 10(*c*) and 10(*d*).

It should be noted that the priority order between the halftones is determined such that the arrangement of the standard dots has the minimum inter dot distance in FIGS. 10(*a*) and 10(*b*). Accordingly, the result obtained in FIGS. 10(*a*) and 10(*b*) is similar to that in the case that the priority order between the halftones is determined based on the blue noise property. In the dot patterns shown in FIGS. 10(*c*) and 10(*d*), it is possible to solve the problem of the method of determining the priority order between the halftones based on the blue noise property.

As described above, with respect to the cyclic dot positions, when the arrangement is determined such that the arrangement becomes random and uniform to some extent, instead of concentrating to the high frequency component, it is preferred to concentrate to the high frequency component having the dot cycle that is the second smallest with respect to the cyclic dot positions.

As described above, in the image forming apparatus 10 and the method of producing the threshold value matrix in the embodiment, even when the image forming unit 40 has the low resolution, it is possible to obtain the image with good appearance, in which the pattern having the line number smaller than that of the ordinary halftone is not outstanding, and the bias of the pattern having the angle different from that of the ordinary halftone is minimized.

Second Embodiment

A second embodiment of the present invention will be explained next. In the second embodiment, an image forming apparatus has a configuration similar to that of the image forming apparatus, and an explanation thereof is omitted. Further, in the second embodiment, the threshold value matrix generating unit 31 is configured to generate the threshold value matrix in a way similar to that in the first embodiment, except the arrangement of the standard dots on which the threshold value matrix is generated.

Figure 13:
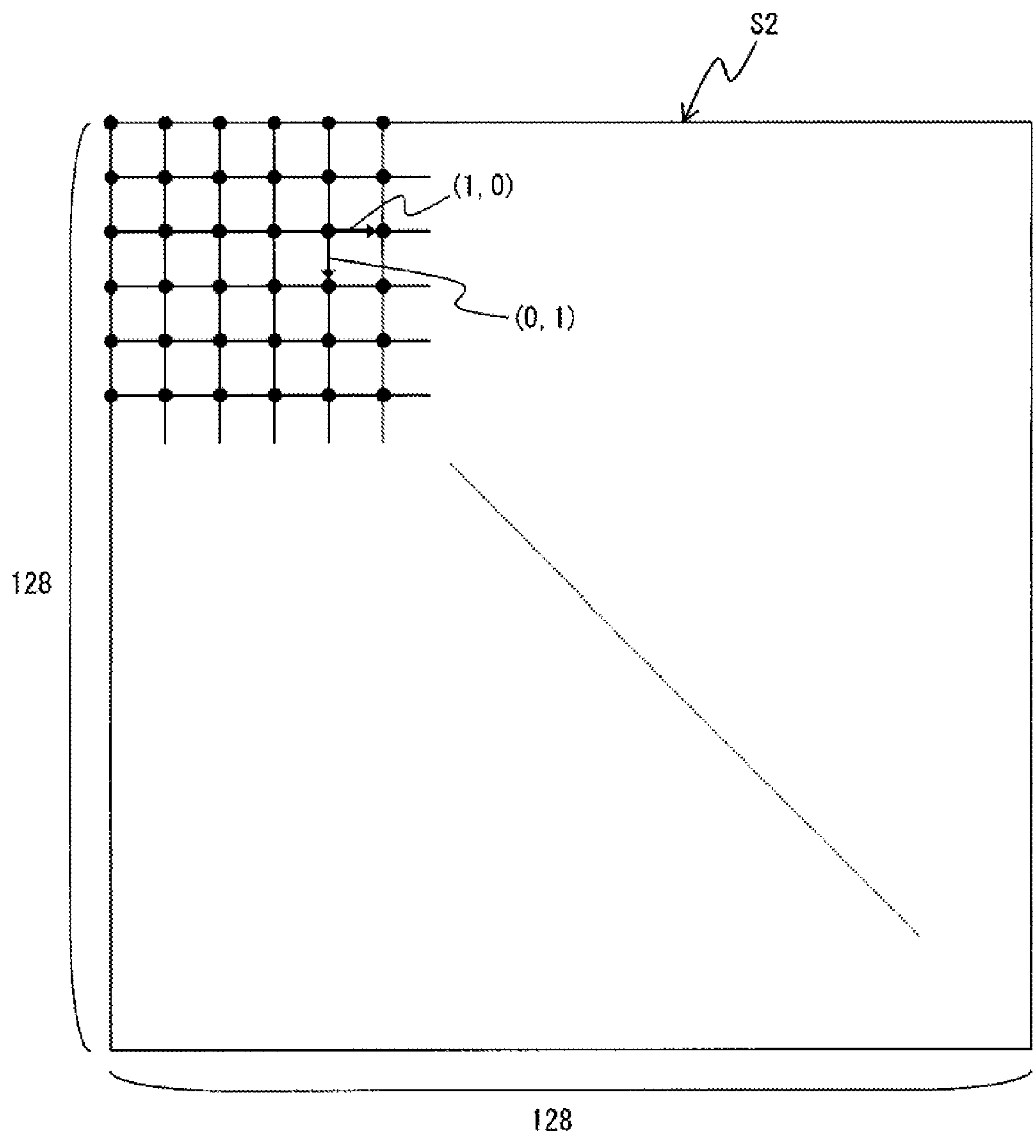
FIG. 13 is a schematic view showing an example of an arrangement of standard dots according to a second embodiment of the present invention.

FIG. 13 is a schematic view showing an example of an arrangement S2 of the standard dots according to the second embodiment of the present invention. In the example shown in FIG. 13, the standard dots are arranged on the two-dimensional plane having the pixel pitch of 600 DPI, so that the standard dots have the cycle of 600 lines, that is, all of the pixels become the standard dots. More specifically, 16,384 of the standard dots are arranged on 128×128 of the pixel plane. Further, the halftone corresponding to the standard dot is formed of one pixel, and all of the pixels have the priority order of "0" between the halftones.

Figure 14A:
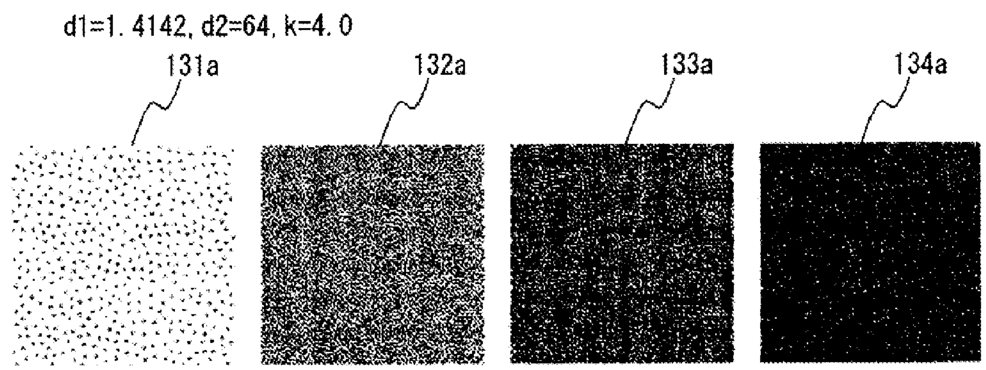
FIGS. 14(*a*) to 14(*c*) are schematic views showing examples of halftone images according to the second embodiment of the present invention.
Figure 14B:
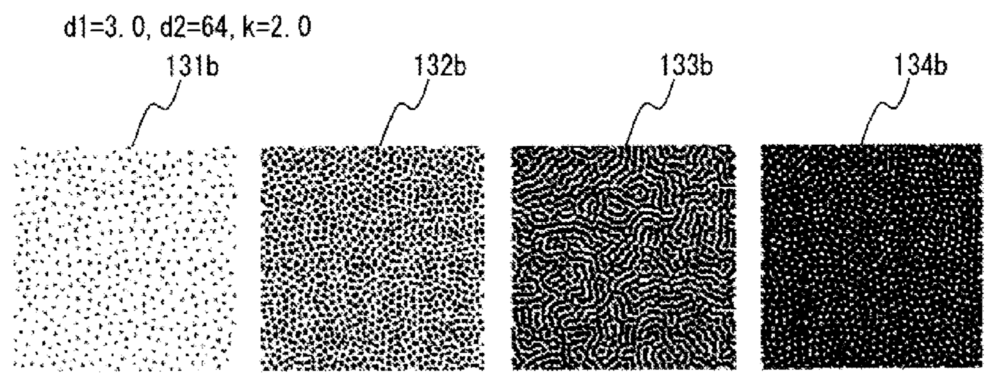
Figure 14C:
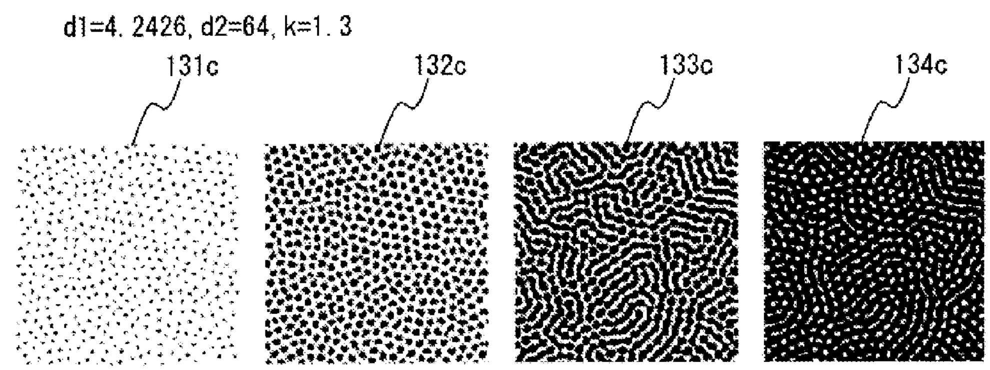

FIGS. 14(*a*) to 14(*c*) are schematic views showing examples of the halftone images according to the second embodiment of the present invention.

As described above, when the priority order between the halftones is determined, the specific parameters are provided to the potential, thereby generating the threshold value matrix. The halftone images shown in FIGS. 14(*a*) to 14(*c*) are obtained using the threshold value matrix.

FIG. 14(*a*) shows the halftone images 131*a* to 134*a* formed when the distance d1 is equal to 1.4142, the distance d2 is equal to 64, and the constant k is equal to 4.0 (d1=1.4142, d2=64, k=4.0). The halftone images 131*a* to 134*a* represent the dot patterns generated at the output gradations of 7, 64, 128, and 192, respectively.

FIG. 14(*b*) shows the halftone images 131*b* to 134*b* formed when the distance d1 is equal to 3.0, the distance d2 is equal to 64, and the constant k is equal to 4.0 (d1=1.4142, d2=64, k=4.0). The halftone images 131*b* to 134*b* represent the dot patterns generated at the output gradations of 7, 64, 128, and 192, respectively.

FIG. 14(*c*) shows the halftone images 131*c* to 134*c* formed when the distance d1 is equal to 4.2426, the distance d2 is equal to 64, and the constant k is equal to 1.3 (d1=4.2426, d2=64, k=1.3). The halftone images 131*c* to 134*c* represent the dot patterns generated at the output gradations of 7, 64, 128, and 192, respectively.

As shown in FIGS. 14(*a*) to 14(*c*), all of the patterns do not exhibit a specific angle or a specific cycle, and the core dots at the randomly dispersed positions are grown to form the cluster. Further, it can be seen that the size of the cluster is increased in the order from FIG. 14(*a*) to FIG. 14(*b*) to FIG. 14(*c*) as the parameter given by the distance d1 is increased.

In general, a screen of the arrangement of the standard dots having no specific angle or specific cycle is called an FM screen.

As described above, in the image forming apparatus 10 and the method of producing the threshold value matrix, it is possible to generate the dot patterns without specific angle or specific cycle. Further, it is possible to freely adjust the size of the cluster of the dot patterns.

Accordingly, even when the original image contains a cyclic image, it is possible to minimize moiré. Further, it is possible to freely adjust the size of the cluster according to the printing apparatus. Accordingly, it is possible to obtain an image with stable density reproducibility.

Third Embodiment

Figure 15:
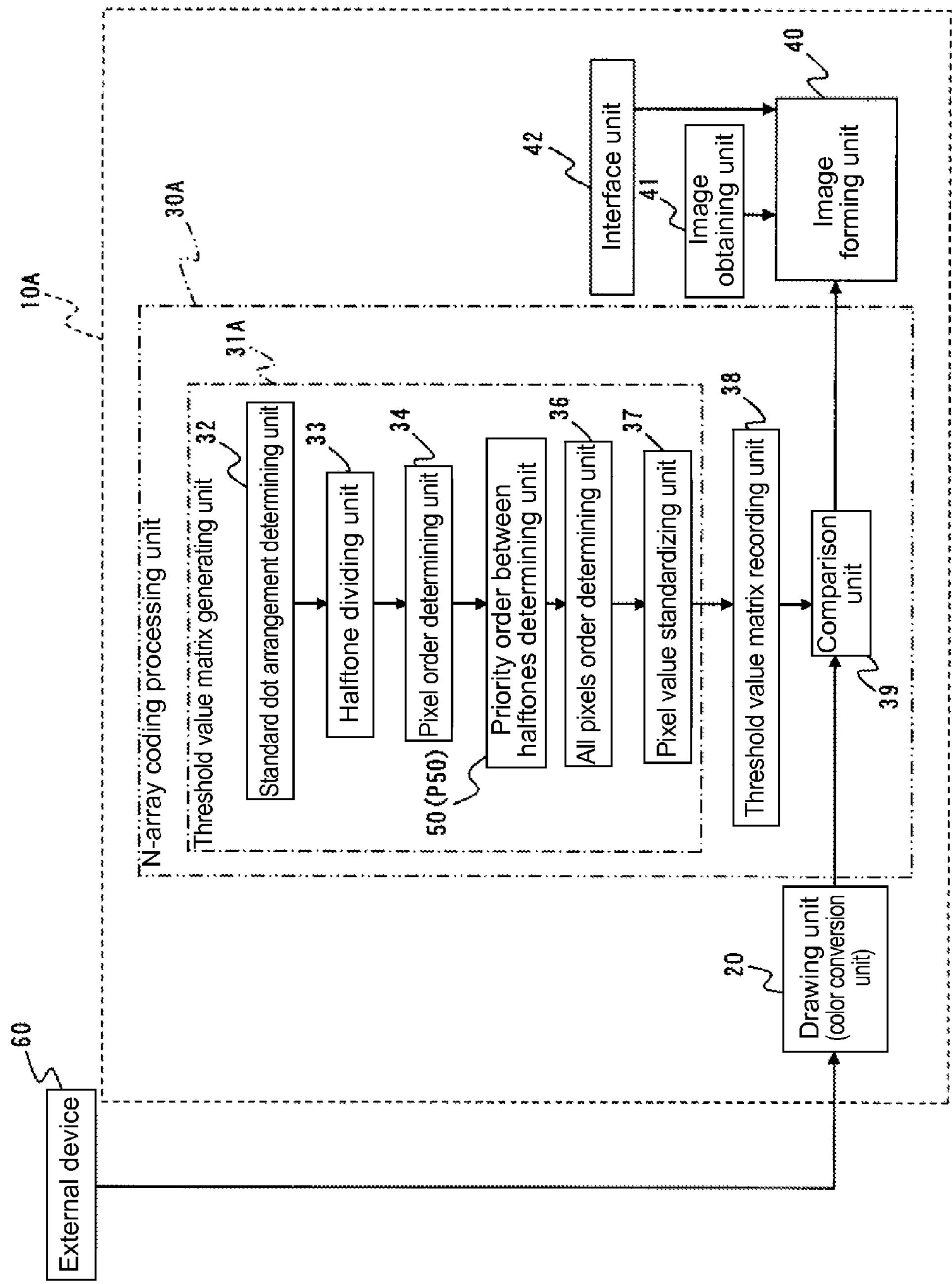
FIG. 15 is a block diagram showing a functional configuration of an image forming apparatus according to a third embodiment of the present invention.

A third embodiment of the present invention will be explained next. FIG. 15 is a block diagram showing a functional configuration of an image forming apparatus 10A according to the third embodiment of the present invention. Components shown in FIG. 15 and similar to those shown in FIG. 1 are designated with the same reference numerals.

In the third embodiment, the image forming apparatus 10A has a configuration and a function different from those of the image forming apparatus 10 in the first embodiment. More specifically, in the third embodiment, similar to the image forming apparatus 10 in the first embodiment, the image forming apparatus 10A includes the drawing unit 20 (the color conversion unit) and the image forming unit 40. Further, different from the image forming apparatus 10 in the first embodiment, the image forming apparatus 10A includes an N-array coding processing unit 30A having a configuration and a function different from those of the N-array coding processing unit 30 in the first embodiment.

In the third embodiment, similar to the N-array coding processing unit 30 in the first embodiment, the N-array coding processing unit 30A includes the pixel value standardizing unit 37 and the threshold value matrix recording unit 38. Further, different from the N-array coding processing unit 30 in the first embodiment, the N-array coding processing unit 30A includes a threshold value matrix generating unit 31A having a configuration and a function different from those of the threshold value matrix generating unit 31 in the first embodiment.

In the third embodiment, the threshold value matrix generating unit 31A is configured to generate the threshold value matrix, in which a pixel cluster of L dots (L is a natural number greater than 2) and a pixel cluster of K dots (K is a natural number less than L) coexist in the highlight portion of the FM screen of the cluster type.

In the third embodiment, the threshold value matrix generating unit 31A is configured to generate the threshold value matrix to be recorded in the threshold value matrix recording unit 38 in advance. Similar to the threshold value matrix generating unit 31 in the first embodiment, the threshold value matrix generating unit 31A includes the standard dot arrangement determining unit 32, the halftone dividing unit 33, the pixel order determining unit 34, the all pixels order determining unit 36, and the pixel value standardizing unit 37. Further, different from the threshold value matrix generating unit 31 in the first embodiment, the threshold value matrix generating unit 31A includes a priority order between halftones determining unit 50 having a configuration and a function different from those of the priority order between halftones determining unit 35 in the first embodiment.

In the third embodiment, the standard dot arrangement determining unit 32 is configured to determine the arrangement of the standard dots. It is noted that the arrangement of the standard dots is not the AM screen shown in FIG. 2, but, similar to the second embodiment, the arrangement S2 of the standard dots shown in FIG. 13. Other features are similar to those in the first embodiment, and explanations thereof are omitted.

Figure 16:
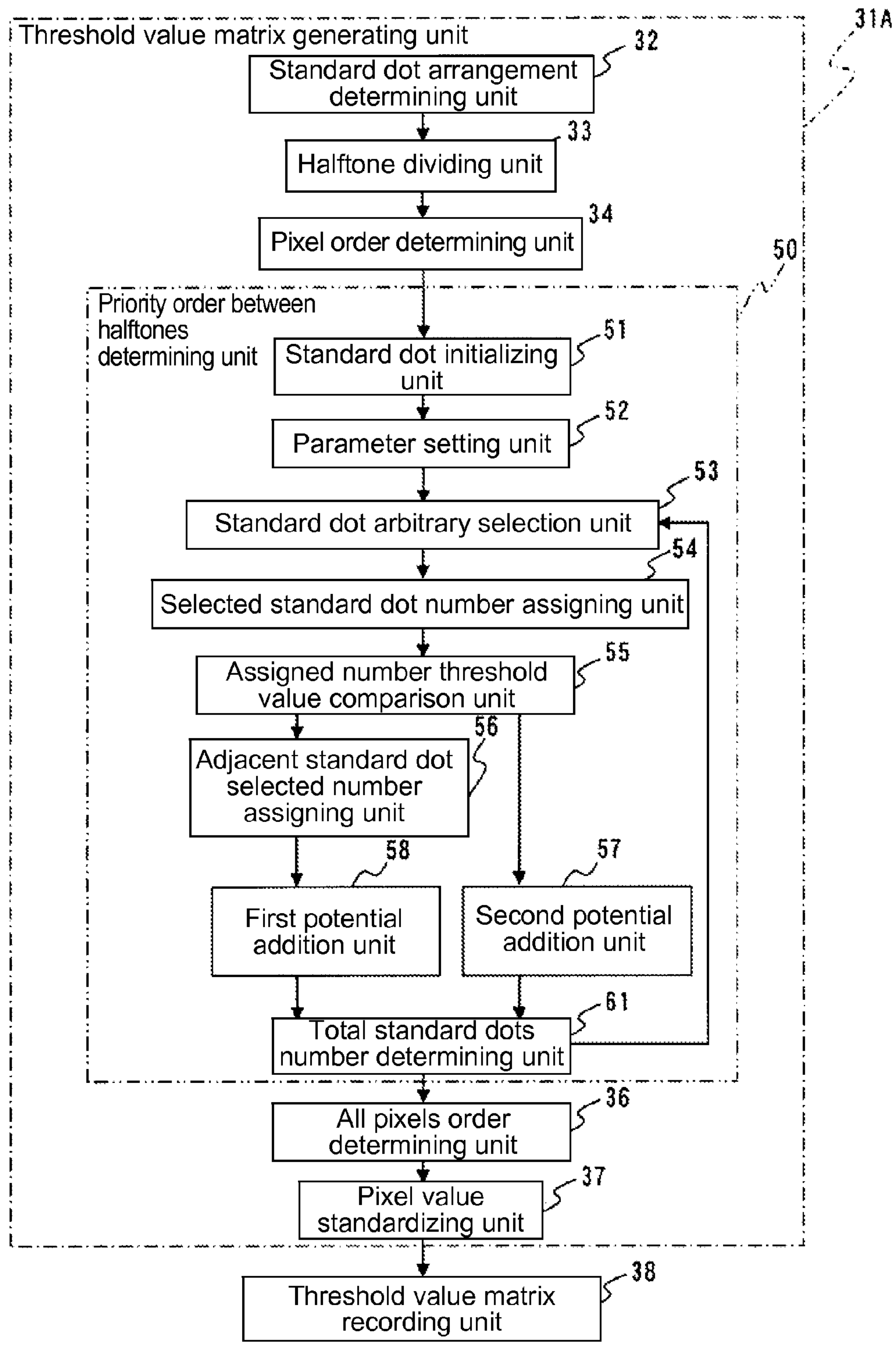
FIG. 16 is a block diagram showing a functional configuration of a threshold value matrix generating unit of the image forming apparatus according to the third embodiment of the present invention.

FIG. 16 is a block diagram showing a functional configuration of the threshold value matrix generating unit 31A of the image forming apparatus 10A according to the third embodiment of the present invention. In FIG. 16, components similar to those of the threshold value matrix generating unit 31 in the first embodiment shown in FIG. 5 are designated with the same reference numerals.

In the third embodiment, the priority order between halftones determining unit 50 is configured to set specific parameters L and TH1. According to the parameters L and TH1, the pixel cluster of L dots (L is a natural number greater than 2) and the pixel cluster of K dots (K is a natural number less than L) coexist in the highlight portion of the FM screen of the cluster type.

As shown in FIG. 16, the priority order between halftones determining unit 50 includes a standard dot initializing unit 51; a parameter setting unit 52; a standard dot arbitrary selection unit 53; a selected standard dot number assigning unit 54; an assigned number threshold value comparison unit 55; an adjacent standard dot selected number assigning unit 56; a first potential addition unit 58; a second potential addition unit 57; and a total standard dots number determining unit 61.

In the third embodiment, the standard dot initializing unit 51 is configured to set "0" to the potential of all of the standard dots. The parameter setting unit 52 is configured to set "0" to an assignment number n (n is an integer between 0 and N−1) to be assigned when the standard dot is selected for initialization. Further, the parameter setting unit 52 is configured to set the parameter L and the threshold value TH1 for determining the highlight portion (TH1 is 0 or a natural number).

In the third embodiment, the standard dot arbitrary selection unit 53 is configured to arbitrarily select one of the standard dots from a standard dot group having a lowest potential among the standard dots with no assignment number n assigned. The selected standard dot number assigning unit 54 is configured to assign the assignment number n to the standard dot selected immediately before. The assigned number threshold value comparison unit 55 is configured to compare the assignment number n assigned with the selected standard dot number assigning unit 54 to the threshold value TH1 set with the parameter setting unit 52.

In the third embodiment, when the assigned number threshold value comparison unit 55 determines that the assignment number n is less than the threshold value TH1, the adjacent standard dot selected number assigning unit 56 is configured to select "L−1" of the standard dots adjacent to the standard dot thus selected, so that the adjacent standard dot selected number assigning unit 56 assigns the numbers from "n+1" to "n+L−1" to each of the "L−1" of the standard dots. The first potential addition unit 58 is configured to add the potential to be received when the potential is given to a position of the "L" of the standard dots selected with the adjacent standard dot selected number assigning unit 56 to the potential of the standard dots with no assignment number n assigned.

In the third embodiment, when the assigned number threshold value comparison unit 55 determines that the assignment number n is equal to or greater than the threshold value TH1, the second potential addition unit 57 is configured to add the potential to be received when the potential is given to a position of the standard dot thus selected to the potential of the standard dots with no assignment number n assigned.

In the third embodiment, the total standard dots number determining unit 61 has a function of determining whether the variable n matches the total standard dot number. When the total standard dots number determining unit 61 determines that the variable n does not match the total standard dot number, the total standard dots number determining unit 61 informs the standard dot arbitrary selection unit 53 that the variable n does not match the total standard dot number. When the total standard dots number determining unit 61 determines that the variable n does match the total standard dot number, the total standard dots number determining unit 61 informs the all pixels order determining unit 36 that the variable n does match the total standard dot number.

In the third embodiment, the addition result of the first potential addition unit 58 and the addition result of the second potential addition unit 57 are input into the all pixels order determining unit 36. The all pixels order determining unit 36 is configured to determine the order of the gradations with respect to all of the pixels according to the addition result of the first potential addition unit 58 and the addition result of the second potential addition unit 57. Further, the pixel value standardizing unit 37 is configured to standardize the order of the pixels determined with the all pixels order determining unit 36 to the threshold values from "1" to "N−1" according to the input gradation number N.

In the third embodiment, the contents of the priority order between halftones determining process P4 performed with the threshold value matrix generating unit 31 shown in FIG. 5 in the first embodiment are changed to the contents of the priority order between halftones determining process P50. The processes P1 to P3, P5 and P6 are similar to those of the threshold value matrix generating unit 31 shown in FIG. 5 in the first embodiment, and explanations thereof are omitted.

In the third embodiment, the priority order between halftones determining unit 50 shown in FIG. 15 is configured to determine the priority order between the halftones from the standard dot arrangement. More specifically, the priority order between halftones determining unit 50 determines the priority order between the halftones through assigning the specific numbers to all of the halftones (the standard dots) thus arranged. In the arrangement of the standard dots shown in FIG. 13, there are 16,384 of the standard dots, so that the specific numbers from 0 to 16383 are assigned to the standard dots.

Figure 17:
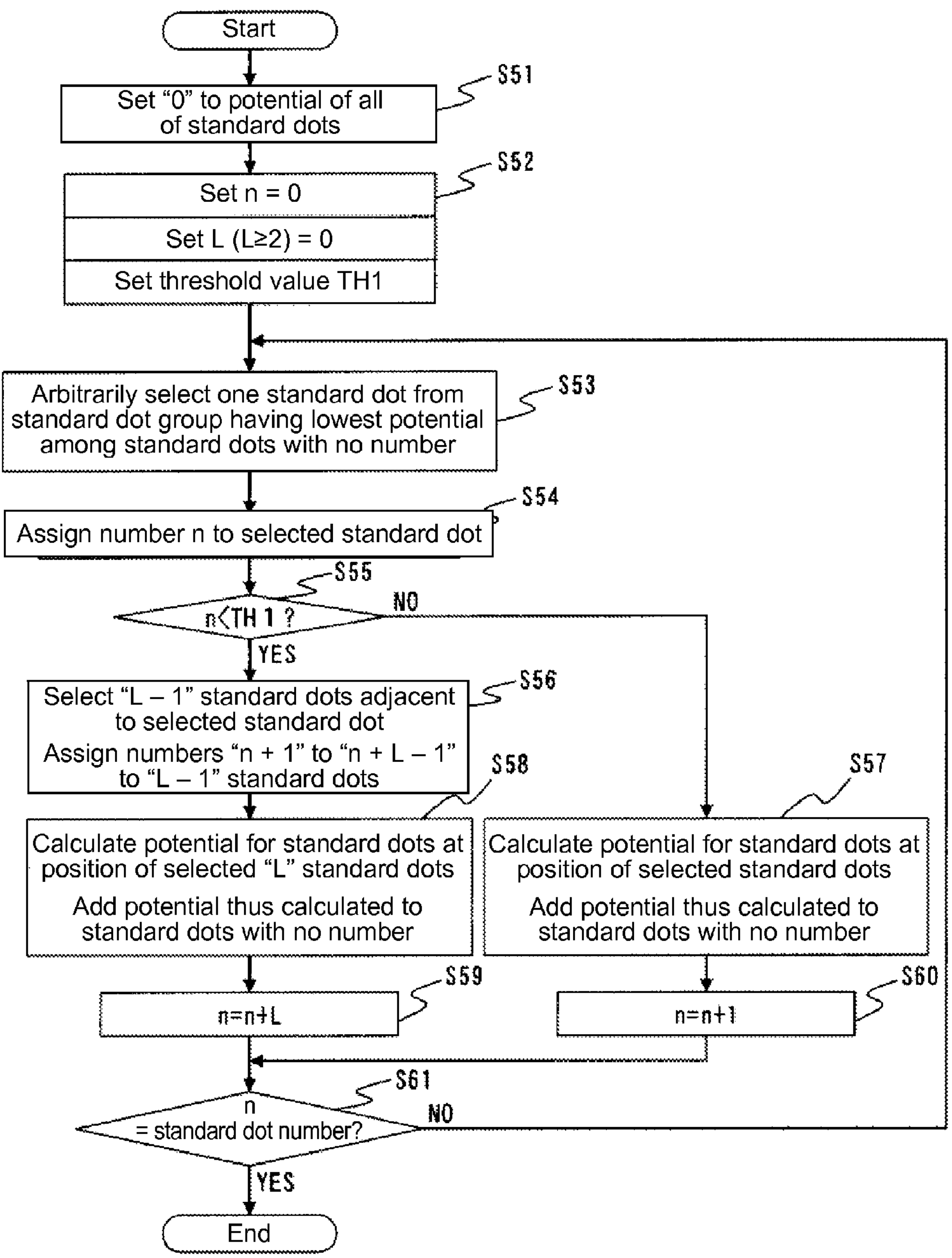
FIG. 17 is a flow chart showing an operation flow of the threshold value matrix generating unit of the image forming apparatus in a priority order between halftones determining process according to the third embodiment of the present invention.
Figure 18:
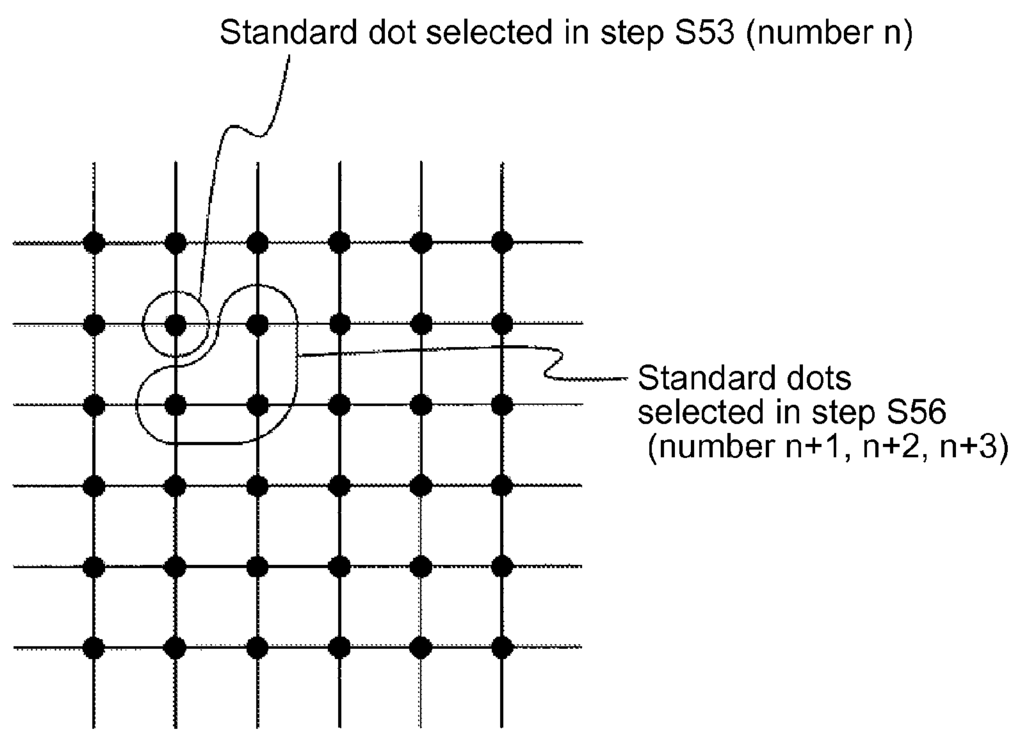
FIG. 18 is a schematic view showing the standard dots selected per L dots according to the third embodiment of the present invention.

FIG. 17 is a flow chart showing an operation flow of the threshold value matrix generating unit 31A of the image forming apparatus 10A in the priority order between halftones determining process P50 according to the third embodiment of the present invention. FIG. 18 is a schematic view showing the standard dots selected per L dots according to the third embodiment of the present invention. The operation flow of the priority order between halftones determining process P50 will be explained with reference to FIG. 17.

As shown in FIG. 17, when the priority order between halftones determining unit 50 starts the operation, the process proceeds to step S51. In step S51, the standard dot initializing unit 51 sets "0" to the potential of all of the standard dots, and the process proceeds to step S52. In step S52, the parameter setting unit 52 sets "0" to the variable n, the variable L, and the threshold value TH1 for initialization, and the process proceeds to step S53.

In step S53, the standard dot arbitrary selection unit 53 arbitrarily selects one of the standard dots from the standard dot group having the lowest potential among the standard dots with no number assigned. It is noted that immediately after the initialization, the potential of all of the standard dots is "0", and no number is assigned to all of the standard dots. Accordingly, the standard dot arbitrary selection unit 53 randomly selects one standard dot from all of the standard dots. Then, the process proceeds to step S54.

In step S54, the selected standard dot number assigning unit 54 assigns the number n to the standard dot selected immediately before, and the process proceeds to step S55. In step S55, the assigned number threshold value comparison unit 55 compares the variable n with the threshold value TH1. When the assigned number threshold value comparison unit 55 determines that the variable n is smaller than the threshold value TH1, the process proceeds to step S56. When the assigned number threshold value comparison unit 55 determines that the variable n is not smaller than the threshold value TH1, the process proceeds to step S57.

In step S56, the adjacent standard dot selected number assigning unit 56 selects the "L−1" of the standard dots adjacent to the standard dot selected in step S53, so that the adjacent standard dot selected number assigning unit 56 assigns the numbers "n+1" to "n+L−1" to the "L−1" of the standard dots. For example, when the parameter L is 4, the adjacent standard dot selected number assigning unit 56 selects 3 of the standard dots adjacent to the standard dot selected in step S53 as shown in FIG. 18, so that the adjacent standard dot selected number assigning unit 56 assigns the numbers "n+1", "n+2", and "n+3" to the standard dots. Then, the process proceeds to step S58.

In step S58, the first potential addition unit 58 calculates the potential to be received by each of the standard dots when the potential is given to the position of the "L" of the standard dot selected immediately before at the position of the standard dots with no assignment number n assigned. Then, the first potential addition unit 58 adds the potential thus calculated to each of the potentials, and the process proceeds to step S59. It is noted that the potential is similar to that in the first embodiment. In step S59, the adjacent standard dot selected number assigning unit 56 adds "L" to the variable n, and the process proceeds to step S61.

When the assigned number threshold value comparison unit 55 determines that the variable n is not smaller than the threshold value TH1 in step S55, the process proceeds to step S57. In step S57, the second potential addition unit 57 calculates the potential to be received when the potential is given to the position of the standard dot selected in step S57 at the position of the standard dots with no assignment number n assigned. Then, the second potential addition unit 57 adds the potential thus calculated to each of the potentials, and the process proceeds to step S60. It is noted that the potential is similar to that in the first embodiment.

In step S60, the second potential addition unit 57 adds "1" to the variable n, and the process proceeds to step S61. In step S61, the total standard dots number determining unit 61 determines whether the variable n matches the standard dot number (in the case of the arrangement of the standard dots shown in FIG. 13, the standard dot number is 16,384). When the total standard dots number determining unit 61 determines that the variable n does not match the standard dot number, the process returns to step S53. When the total standard dots number determining unit 61 determines that the variable n does match the standard dot number (that is, the numbers are assigned to all of the standard dots), the process is complete.

Through the process from step S51 to step S61, the priority order between halftones determining unit 50 determines the specific numbers to all of the standard dots. It is noted that similar to the first embodiment, although the priority order of the standard dots thus determined is randomly arranged, the priority order is uniform in the space to some extent. Further, the high frequency component is arranged along with the cycle of the distance d1 set to the potential in step S57 and step S58. When the priority order (the number assigned to each of the standard dots) is smaller than the threshold value TH1, the priority order is determined per the standard dot group (cluster) of the "L" of the standard dots.

In the third embodiment, the arrangement of the standard dots is similar to that shown in FIG. 12 in the second embodiment.

Further, the halftone corresponding to the standard dot is formed of one pixel, and all of the pixels have the priority order of "0" between the halftones.

The halftone images will be explained next. When the priority order between the halftones is determined, the following parameters are given to the potential with respect to the halftones described above. The halftone images are obtained under such parameters as the distance d1 equal to 3.0, the distance d2 equal to 64, and the constant k equal to 2.0 (d1=3.0, d2=64, k=2.0) using the threshold value matrix. Further, when the threshold value matrix is generated, the specific parameters are given to the variable L and the threshold value TH1 in step S52.

Figure 19A:
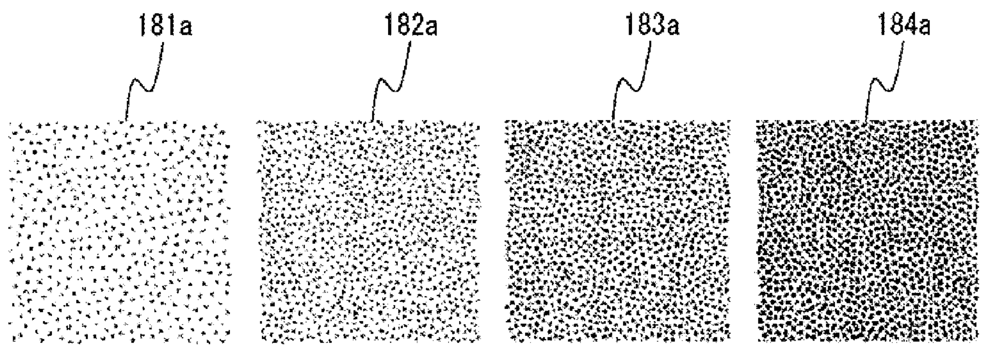
FIGS. 19(*a*) to 19(*c*) are schematic views showing examples of halftone images according to the third embodiment of the present invention.
Figure 19B:
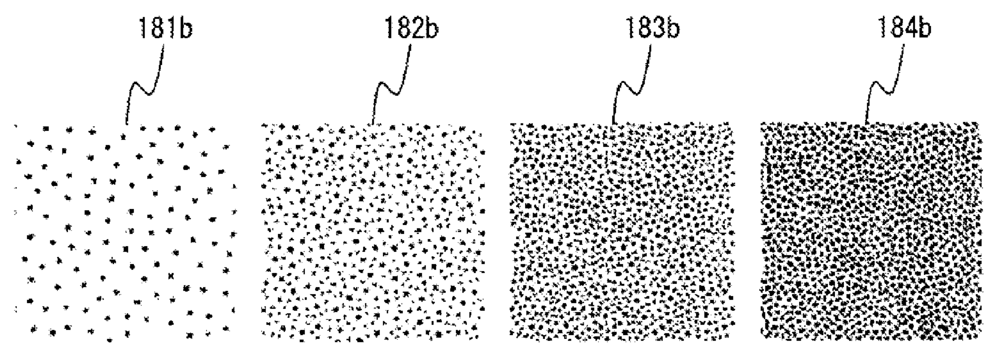
Figure 19C:
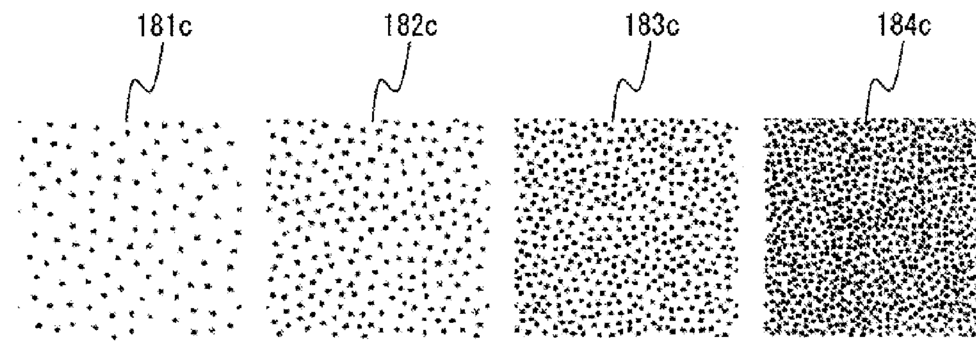

FIGS. 19(*a*) to 19(*c*) are schematic views showing examples of the halftone images according to the third embodiment of the present invention.

FIG. 19(*a*) shows the halftone images 181*a* to 184*a* formed when the variable L is equal to 4 and the threshold value TH1 is equal to 0 (L=4, TH1=0). The halftone images 181*a* to 184*a* represent the dot patterns generated at the output gradations of 7, 14, 28, and 50, respectively.

FIG. 19(*b*) shows the halftone images 181*b* to 184*b* formed when the variable L is equal to 4 and the threshold value TH1 is equal to 516 (L=4, TH1=516). The halftone images 181*b* to 184*b* represent the dot patterns generated at the output gradations of 7, 14, 28, and 50, respectively.

FIG. 19(*c*) shows the halftone images 181*c* to 184*c* formed when the variable L is equal to 4 and the threshold value TH1 is equal to 3,216 (L=4, TH1=3,216). The halftone images 181*c* to 184*c* represent the dot patterns generated at the output gradations of 7, 14, 28, and 50, respectively.

As described above, the priority order smaller than the threshold value TH1 is determined per the standard dot group (cluster) of the "L" of the standard dots. In the examples shown in FIGS. 14(*a*) to 14(*c*), the output gradations corresponding to the threshold value TH1 is calculated as TH1×265/16,384. The dot patterns generated at the output gradation smaller than 8 in FIG. 19(*b*) and the output gradation smaller than 50 create only the cluster of the dots of the "L" dots (4 dots).

Further, in the examples shown in FIG. 19(*a*), the threshold value is equal to 0. Accordingly, the one dot is created, not the cluster of the dots of the "L" dots (4 dots) as shown in FIG. 19(*b*) and FIG. 19(*c*). Further, when the arrangement per dot cluster of the 4 dots is continued as shown in FIG. 19(*c*), the dots tend to be accumulated and the bias becomes more visible as the output gradation is increased. On the other hand, as shown in FIG. 19(*b*), when the arrangement per dot cluster of the 4 dots is stopped at the point in which the dots are dispersed (the low output gradation). Then, the dots are arranged per dot cluster smaller than 4 dots, so that the bias becomes less visible.

As described above, in the image forming apparatus 10A and the method of producing the threshold value matrix in the third embodiment, it is possible to generate the FM screen of the cluster type. Further, it is possible to adjust to generate only the dot cluster of the dot number set with respect to the dot patterns generated in the highlight portion of the FM screen.

Accordingly, even when the image forming unit 40 has poor dot reproducibility of isolated one dot, it is possible to form the image in which the density reproducibility at the highlight portion is stable through generating the dots per cluster of a few dots. Further, the dots are arranged per cluster of a few dots, the arrangement is stopped at the point where the dots are dispersed. Afterward, the dots are arranged per dot cluster of a smaller number of dots. As a result, it is possible to form the image in which the bias due to the concentration of the dots at the highlight portion becomes less visible.

It is noted that the present invention is not limited to the embodiments described above, and the present invention can be modified as follows.

In the embodiments described above, the present invention is applied to the image forming apparatus 10 and the image forming apparatus 10A of the electro-photography type. The present invention is applicable to a laser printer or an inkjet printer. Further, the present invention is applicable to a printer engine of a copier, a facsimile, and a MFP (Multi Function Product). Further, the present invention is applicable to a display device such as a display and the like.

The disclosure of Japanese Patent Application No. 2011-241881, filed on Nov. 04, 2011, is incorporated in the application.

While the invention has been explained with reference to the specific embodiments of the invention, the explanation is illustrative and the invention is limited only by the appended claims.

What is claimed is:

1. An image forming apparatus for depicting an M-level gradation image formed of a plurality of pixels having pixel numbers of M gradations (M is a natural number equal to or greater than three) through a plurality of halftones, comprising:

- a threshold value generating unit for generating a threshold value matrix of N gradations (N is a natural number equal to or greater than two); and
- a comparison unit for comparing each of the pixels numbers of the pixels of the M-level gradation image with each of corresponding threshold values of the threshold value matrix so that the comparison unit converts the M-level gradation image to an N-level gradation image formed of a plurality of pixels having pixel numbers of the N gradations, wherein said threshold value generating unit is configured to determine an arrangement of standard dots, said threshold value generating unit is configured to divide all of the pixels to the halftones with an arrangement point of each of the standard dots as a center, said threshold value generating unit is configured to determine an order of the gradations of the pixels contained in each of the halftones thus divided, said threshold value generating unit is configured to determine an order of the standard dots so that the arrangement of the standard dots determined upon completing ordering of a half of a total number of the standard dots is concentrated in a specific cycle determined by the arrangement of the standard dots from the arrangement points of the standard dots as the center of the halftones, said threshold value generating unit is configured to determine a priority order of the gradations between the halftones, said threshold value generating unit is configured to determine an order of the threshold values of the gradations of all of the pixels from "1" to "N−1" according to the order of the gradations of the pixels contained in each of the halftones and the priority order of the gradations between the halftones so that the threshold value generating unit generates the threshold value matrix having the threshold values from "1" to "N−1".

2. The image forming apparatus according to claim 1, wherein said threshold value generating unit includes:

a standard dot arrangement determining unit configured to determine the arrangement of the standard dots;

a halftones division unit configured to divide the pixels into the halftones with the arrangement point of each of the standard dots as the center;

a pixel order determining unit configured to determine the order of the gradations of the pixels contained in each of the halftones;

a halftone order determining unit configured to add a potential having a flat portion from the arrangement point of the standard dot as a core of the halftones near the center of the standard dot and continuously decreasing as a distance from the center increases so that the halftone order determining unit determines the priority order of the gradations between the halftones according to a sum of the potential;

an all pixels order determining unit configured to determine a pixel order of the gradations of the pixels according to a determination result of the pixel order determining unit and a determination result of the halftone order determining unit; and a pixel number standardization unit configured to standardize the pixel order determined with the all pixels order determining unit to the threshold values from "1" to "N−1" according to input gradations N.

3. The image forming apparatus according to claim 2, wherein said standard dot arrangement determining unit is configured to set all of pixels on an FM screen as the standard dots in the arrangement of the standard dots, and said pixel order determining unit is configured to assign "0" as the order of the pixels contained in each of the halftones.

4. The image forming apparatus according to claim 2, halftone order determining unit is configured to add the potential having a value "1" at the center of the standard dot and a value "0.5" in a distance between the standard dots having at least a second smallest distance from the center of the standard dot in the arrangement of the standard dots.

5. The image forming apparatus according to claim 2, halftone order determining unit is configured to add the potential decreasing from the center of the standard dot according to a sigmoidal function.

6. An image forming apparatus for converting an M-level gradation image formed of a plurality of pixels having pixel numbers of M gradations (M is a natural number equal to or greater than three) to a dot pattern of N gradations (N is a natural number equal to or greater than two) using an FM screen of a cluster type so that the image forming apparatus forms an image, comprising:

a threshold value generating unit for generating a threshold value matrix of the N gradations; and a comparison unit for comparing each of the pixels numbers of the pixels of the M-level gradation image with each of corresponding threshold values of the threshold value matrix so that the comparison unit converts the M-level gradation image to the N-level gradation image formed of a plurality of pixels having pixel numbers of the N gradations, wherein said threshold value generating unit is configured to coexist a pixel cluster of L dots (L is a natural number equal to or greater than two) and a pixel cluster of K dots (K is a natural number less than L) at a highlight portion of the FM screen of the cluster type.

7. The image forming apparatus according to claim 1, wherein said a standard dot arrangement determining unit configured to determine the arrangement of the standard dots;

a halftones division unit configured to divide the pixels into the halftones with the arrangement point of each of the standard dots as the center;

a pixel order determining unit configured to determine the order of the gradations of the pixels contained in each of the halftones;

a standard dot initializing unit configured to set "0" to a value of a potential to be added to the standard dot;

a parameter setting unit configured to set "0" to an assignment number n (n is an integer between "0" and "N−1") to be assigned when the standard dot is selected, L (L is a natural number equal to or greater than two), and a threshold value for determining the highlight portion (the threshold value is zero or a natural number);

a standard dot arbitrary selection number assigning unit configured to arbitrarily select one of the standard dots from a standard dot group without the assignment number n and having a lowest potential so that the standard dot arbitrary selection number assigning unit assigns the assignment number n to the one of the standard dots;

an assigned number threshold value comparison unit configured to compare the assignment number n with the threshold value;

an adjacent standard dot selected number assigning unit configured to select "L−1" of the standard dots adjacent to the one of the standard dots when the assigned number threshold value comparison unit determines that the assignment number n is less than the threshold value so that the adjacent standard dot selected number assigning unit assigns numbers from "n+1" to "n+L−1" to the "L" of the standard dots;

a first potential addition unit configured to add the potential to be received when the potential is given to a position of the "L" of the standard dots selected with the adjacent standard dot selected number assigning unit to the potential of the standard dots without the assignment number n;

a second potential addition unit configured to add the potential to be received when the potential is given to a position of the one of the standard dots to the potential of the standard dots without the assignment number n when the assigned number threshold value comparison unit determines that the assignment number n is equal to or greater than the threshold value;

an all pixels order determining unit configured to determine a pixel order of the gradations of all of the pixels according to an addition result of the first potential addition unit and an addition result of the second potential addition unit; and a pixel number standardization unit configured to standardize the pixel order determined with the all pixels order determining unit to the threshold values from "1" to "N−1" according to input gradations N.

8. A method of producing a threshold value matrix used when an N-level gradation image (N is a natural number equal to or greater than two) is obtained from an M-level gradation image (M is a natural number equal to or greater than three), comprising the steps of:

a standard dot arrangement determining process of determining an arrangement of standard dots;

a halftones division process of dividing pixels into a plurality of halftones with an arrangement point of each of the standard dots as a center;

a pixel order determining process of determining an order of the pixels contained in each of the halftones;

a priority order between halftones determining process of determining a priority order between the halftones from the arrangement of the standard dots;

an all pixels order determining process of determining a pixel order of all of the pixels; and a pixel number standardization process of standardizing the pixel order to threshold values from "1" to "N−1" according to input gradations N.

9. A method of producing a threshold value matrix used when an N-level gradation image (N is a natural number equal to or greater than two) is obtained from an M-level gradation image (M is a natural number equal to or greater than three), comprising a step of:

coexisting a pixel cluster of L dots (L is a natural number equal to or greater than two) and a pixel cluster of K dots (L is a natural number equal to or greater than three) at a highlight portion of an FM screen of a cluster type.

* * * * *